(12) United States Patent
Yiu et al.

(10) Patent No.: US 10,879,964 B2
(45) Date of Patent: Dec. 29, 2020

(54) DUAL BEAM OPERATION FOR MOBILITY

(71) Applicant: APPLE INC., Cupertino, CA (US)

(72) Inventors: Candy Yiu, Portland, OR (US); Yuan Zhu, Beijing (CN); Yujian Zhang, Beijing (CN); Yushu Zhang, Beijing (CN); Wenting Chang, Beijing (CN)

(73) Assignee: APPLE INC., Cupertino, CA (US)

( * ) Notice: Subject to any disclaimer, the term of this patent is extended or adjusted under 35 U.S.C. 154(b) by 87 days.

(21) Appl. No.: 16/073,303

(22) PCT Filed: Dec. 28, 2016

(86) PCT No.: PCT/US2016/068990
§ 371 (c)(1),
(2) Date: Jul. 26, 2018

(87) PCT Pub. No.: WO2017/171952
PCT Pub. Date: Oct. 5, 2017

(65) Prior Publication Data
US 2019/0052317 A1 Feb. 14, 2019

Related U.S. Application Data

(60) Provisional application No. 62/317,329, filed on Apr. 1, 2016.

(51) Int. Cl.
*H04B 7/024* (2017.01)
*H04B 7/0408* (2017.01)
(Continued)

(52) U.S. Cl.
CPC .......... *H04B 7/024* (2013.01); *H04B 7/0408* (2013.01); *H04B 7/0617* (2013.01);
(Continued)

(58) Field of Classification Search
None
See application file for complete search history.

(56) References Cited

U.S. PATENT DOCUMENTS

2014/0112236 A1\* 4/2014 Jung ................. H04W 36/0007
370/312
2015/0229370 A1\* 8/2015 Lidian ................... H04L 1/1861
370/335
(Continued)

FOREIGN PATENT DOCUMENTS

WO 2016043502 A1 3/2016

OTHER PUBLICATIONS

PCT Application No. PCT/US2016/068990, Filing Date Dec. 28, 2016 Candy Yiu, International Search Report; dated Feb. 6, 2017; 16 Pages.
(Continued)

*Primary Examiner* — Noel R Beharry
*Assistant Examiner* — Richard Schnell

(57) ABSTRACT

Technology for a user equipment (UE) operable to communicate with an one or more extended transmission reception points (TRPs) is disclosed. The UE can signal a transceiver of the UE to simultaneously broadcast two or more transmission beams to establish a connection with one or more of an extended eNodeB or one or more extended transmission reception points (TRP), wherein each extended TRP is connected to the UE via an extended interface with the extended eNodeB. The UE can decode, at the UE, higher layer signaling received from the one or more extended TRPs to form beam association, beam addition, beam release, beam change, or a combination thereof between the UE and the one or more extended TRPs.

23 Claims, 14 Drawing Sheets

(51) Int. Cl.
*H04W 76/27* (2018.01)
*H04W 74/08* (2009.01)
*H04B 7/06* (2006.01)
*H04B 7/0413* (2017.01)

(52) U.S. Cl.
CPC ....... *H04W 74/0833* (2013.01); *H04W 76/27* (2018.02); *H04B 7/0413* (2013.01)

(56) References Cited

U.S. PATENT DOCUMENTS

2015/0351135 A1 12/2015 Schmidt et al.
2017/0257780 A1* 9/2017 Ryoo ................... H04W 16/28

OTHER PUBLICATIONS

Tsang et al.; "Coding the Beams: Improving Beamforming Training in mmWave Communication System." Arxiv.org, Cornell University Library; Apr. 6, 2011; XP080548086; 6 Pages.

* cited by examiner

DUAL BEAM OPERATION FOR MOBILITY

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
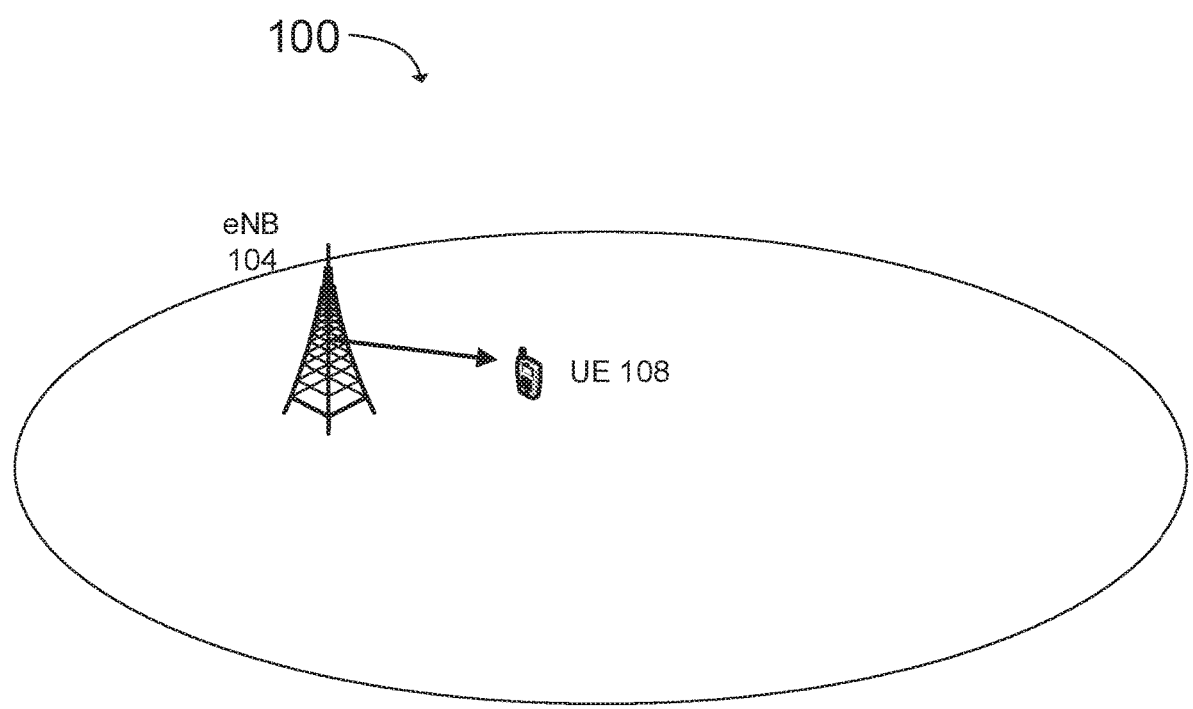
FIG. 1 illustrates a mobile communication network within a cell in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

As wireless data traffic increases since deployment of 3GPP fourth generation (4G) communication systems, efforts have been made to develop an improved fifth generation (5G) communication system. To accommodate more traffic, the 3GPP 5G communication system is considered to be implemented in higher frequency (mmWave) bands, e.g., 60 GHz bands. To decrease propagation loss of the radio waves and increase the transmission distance, the beamforming, massive multiple-input multiple-output (MIMO), Full Dimensional MIMO (FD-MIMO), array antenna, analog beam forming, and other large scale antenna techniques can be provided in 3GPP 5G communication systems. In addition, in 3GPP 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 3GPP 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

In addition, an application of the Internet relating to wireless communication may include the Internet of Things (IoT) where Machine Type Communication (MTC), critical MTC, and the like may now be included. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In one aspect, the 3GPP 5G communication systems may be used in IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Furthermore, in narrow beam based wireless communication systems, transmission reception points (TRPs) can form beam cells, which can also be referred to as a fifth generation (5G) radio access technology (RAT) beam cells. These beam cells can operate by leveraging advanced multiple input multiple output (MIMO), or massive MIMO systems, as well as cooperative multipoint (CoMP) transmission and reception schemes. Beam cells are expected to be one of the key features of 5G wireless communication systems, as the use of beam cells can increase spectral efficiency via high order multi-user MIMO. In addition, beam cells can extend cellular communication into frequency bands above 6 GHz. With respect to the overall beam cell design for 5G wireless communication systems, it is desirable for downlink physical control channels to efficiently support beamforming-centric system operation, as well as flexible multi-point transmission for a seamless user experience under conditions of mobility and channel blockage.

In one aspect, 3GPP 5G provides requirements and specifications for a new radio (NR) system to support mobile broadband, massive MTC and critical MTC, etc. In NR systems, it can be assumed that a wireless communication network and the UE are beamforming to achieve high antenna gain to compensate the propagation loss of the high frequency band. Mobility then becomes one of the biggest challenges. As described herein, the present technology provides a solution where a user equipment (UE) can communicate with an eNodeB and/or transmission reception points (TRPs). The UE can signal a transceiver of the UE to simultaneously broadcast two or more transmission beams to establish a connection with one or more of an 3GPP 5G extended eNodeB or one or more extended TRPs, wherein each extended TRP is connected via a 3GPP 5G extended interface to the 3GPP 5G extended eNodeB. The UE can encode, at the UE, higher layer signaling received from the one or more extended TRPs to form beam association, beam addition, beam release, beam change, or a combination thereof between the UE and the one or more extended TRPs.

In one example, a 3GPP 5G eNodeB (including either a small cell and/or a macro cell) may be referred to herein as an extended eNB. 3GPP 5G TRPs (including dual beam and multi-beam) may be referred to herein as extended TRPs.

FIG. 1 illustrates a mobile communication network within a cell 100 having an evolved node B (eNB or eNodeB) with a mobile device. FIG. 1 illustrates an eNB 104 that can be associated with an anchor cell, macro cell or primary cell. Also, the cell 100 can include a mobile device, such as, for example, a User Equipment (UE or UEs) 108 that can be in communication with the eNB 104. The eNB 104 can be a station that communicates with the UE 108 and can also be referred to as a base station, a node B, an access point, and the like. In one example, the eNB 104 can be a high transmission power eNB, such as a macro eNB, for coverage and connectivity. The eNB 104 can be responsible for mobility and can also be responsible for radio resource control (RRC) signaling. The UE or UEs 108 can be supported by the macro eNB 104. The eNB 104 can provide communication coverage for a particular geographic area. In 3GPP, the term "cell" can refer to a particular geographic coverage area of eNB and/or an eNB subsystem serving the coverage area with an associated carrier frequency and a frequency bandwidth, depending on the context in which the term is used.

Figure 2:
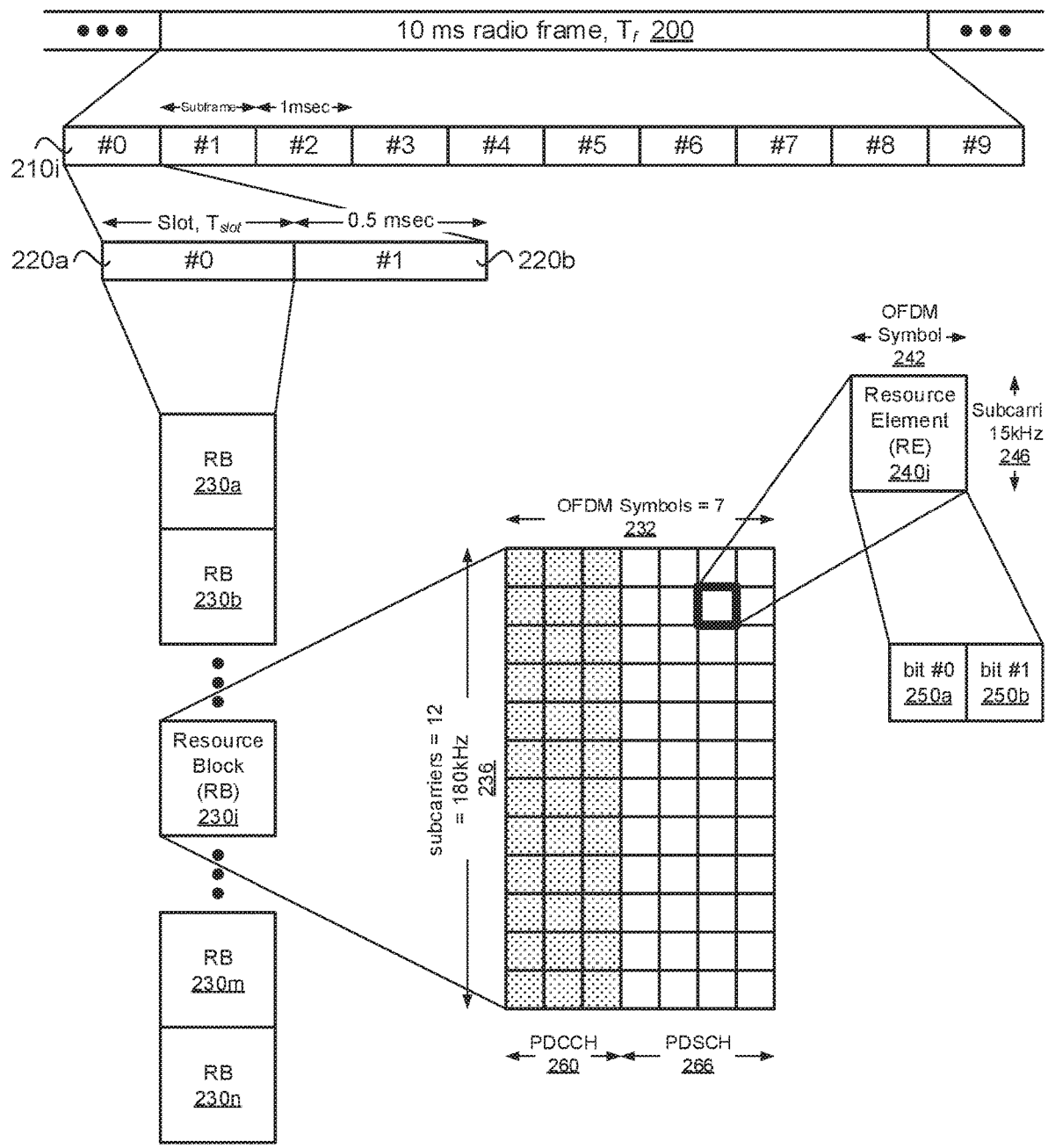
FIG. 2 illustrates a diagram of radio frame resources (e.g., a resource grid) for a downlink (DL) transmission including a physical downlink control channel (PDCCH) in accordance with an example.

FIG. 2 illustrates a diagram of radio frame resources (e.g., a resource grid) for a downlink (DL) transmission including a physical downlink control channel (PDCCH) in accordance with an example. In the example, a radio frame 200 of a signal used to transmit the data can be configured to have a duration, Tf, of 10 milliseconds (ms). Each radio frame can be segmented or divided into ten subframes 210$i$ that are each 1 milliseconds (ms) long. Each subframe can be further subdivided into two slots 220$a$ and 220$b$, each with a duration, Tslot, of 0.5 ms. In one example, the first slot (#0) 220$a$ can include a physical downlink control channel (PDCCH) 260 and/or a physical downlink shared channel (PDSCH) 266, and the second slot (#1) 220$b$ can include data transmitted using the PDSCH.

Each slot for a component carrier (CC) used by the node and the wireless device can include multiple resource blocks (RBs) 230$a$, 230$b$, 230$i$, 230$m$, and 230$n$ based on the CC frequency bandwidth. The CC can include a frequency bandwidth and a center frequency within the frequency bandwidth. In one example, a subframe of the CC can include downlink control information (DCI) found in the PDCCH. The PDCCH in the control region can include one to three columns of the first OFDM symbols in a subframe or physical RB (PRB), when a legacy PDCCH is used. The remaining 11 to 13 OFDM symbols (or 14 OFDM symbols, when legacy PDCCH is not used) in the subframe can be allocated to the PDSCH for data (for short or normal cyclic prefix). For example, as used herein, the term 'slot' may be used for 'subframe', or 'transmission time interval (TTI)' can be used for 'frame' or 'frame duration'. In addition, a frame may be considered a user transmission specific quantity (such as a TTI associated with a user and a data flow).

Each RB (physical RB or PRB) 230$i$ can include 12 subcarriers 236 of 15 kHz subcarrier spacing, for a total of 180 kHz (on the frequency axis) and 6 or 7 orthogonal frequency-division multiplexing (OFDM) symbols 232 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 240*i* using short or normal cyclic prefixing, or the resource block can be mapped to 72 REs (not shown) using extended cyclic prefixing. The RE can be a unit of one OFDM symbol 242 by one subcarrier (i.e., 15 kHz) 246.

Each RE can transmit two bits 250*a* and 250*b* of information in the case of quadrature phase-shift keying (QPSK) modulation. Other types of modulation can be used, such as 16 quadrature amplitude modulation (QAM) to transmit 4 bits per RE or 64 QAM to transmit six bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB. The numbers of symbols and subcarriers, as well as the slot length, subframe length, frame length, and other parameters in FIG. 2 are examples of a 3GPP 4G system. The values for 3GPP 5G systems may be different to accommodate the higher communication speeds and bandwidths, as well as the lower communication speeds and bandwidths of the IoT.

Beam Concept in 3GGP 5G

Figure 3:
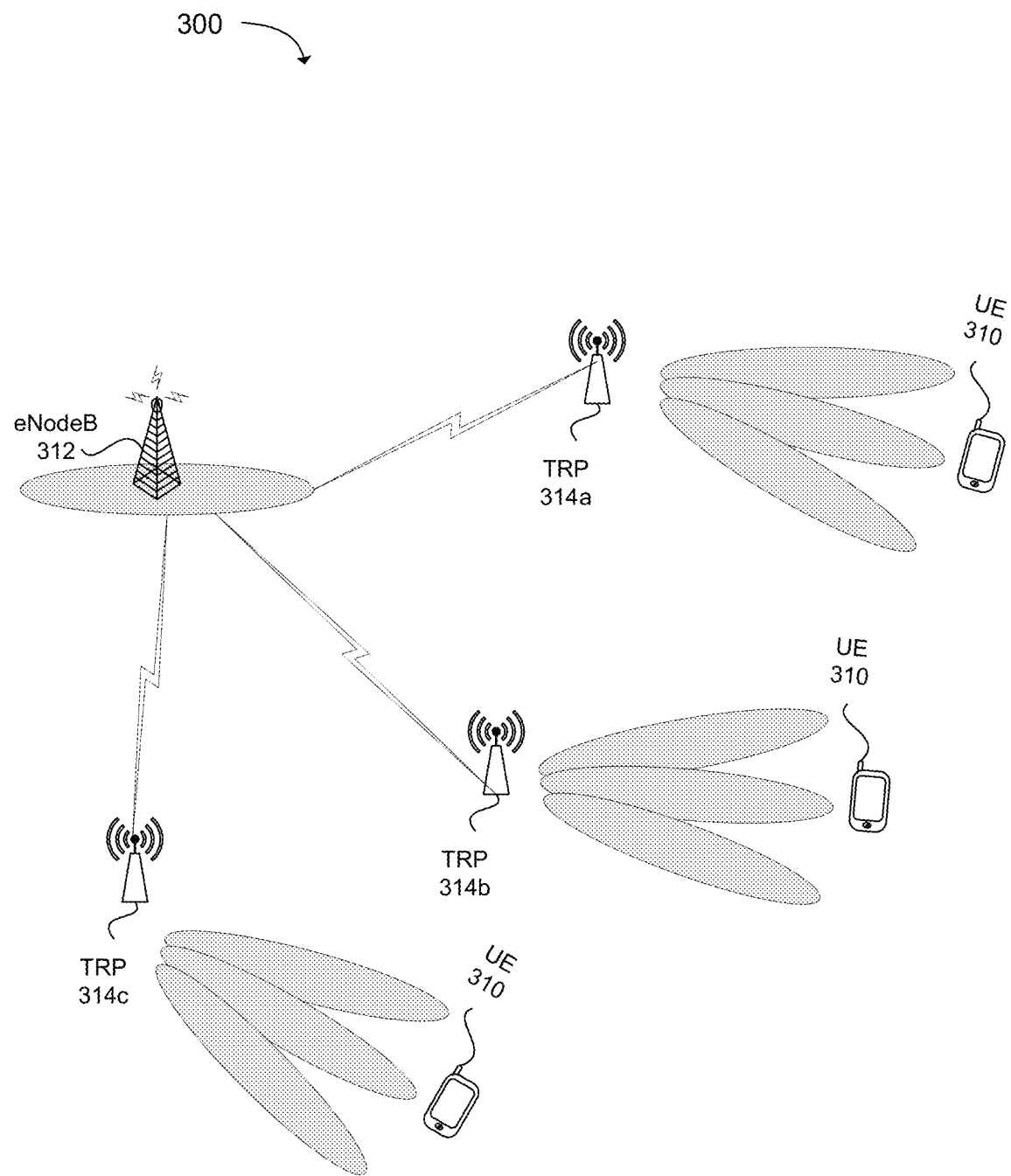
FIG. 3 illustrates a diagram of deployment of third generation partnership project (3GPP) next generation wireless communication system, fifth generation "5G" with macro cells and small cells in co-channel and inter-frequency small cells and beamforming in accordance with an example.

In one aspect, the present technology provides a solution for 3GPP 5G to differ from 3GPP LTE by adding beamforming capability both at the UE and at one or more TRPs, as illustrated in FIG. 3. FIG. 3 illustrates a diagram of deployment of a third generation partnership project (3GPP) next generation wireless communication system that includes 3GPP fifth generation "5G" macro cells and small cells in co-channel and inter-frequency small cells with beamforming. An eNB 312 can have multiple TRPs 314*a-c* (either centralized or distributed). Each TRP 314-*ac* can form multiple beams. The number of beams and simultaneous beams depend on the number of antenna array and the RF capabilities at the extended TRP. For example, each TRP may have multiple RF chains allowing transmission on multiple simultaneous beams. Similarly, a UE 310 can also be configured for beamforming towards the TRP(s) 314*a-c*. UE 310 can have a single beam and/or multiple beams, which also depend on the UE capability.

Beam Sweep

Due to the small coverage of a narrow beam, to cover 360 degrees, a UE and/or TRP may be constrained to beamform at each direction in a TDM manner until all 360 degrees are covered. For example, assume each beam width is 15 degrees. If the TRP can only form ONE beam simultaneously, it will take 24 beams sweep to cover 360 degree. Accordingly, the present invention provides different beam support in NR in the higher layer. In one aspect, the NR and 3GPP 5G can be used or referred to interchangeably. Also, it can be assumed that an eNB can be equipped with multiple RF chains and can form multiple beams toward multiple UEs, simultaneously.

Figure 4:
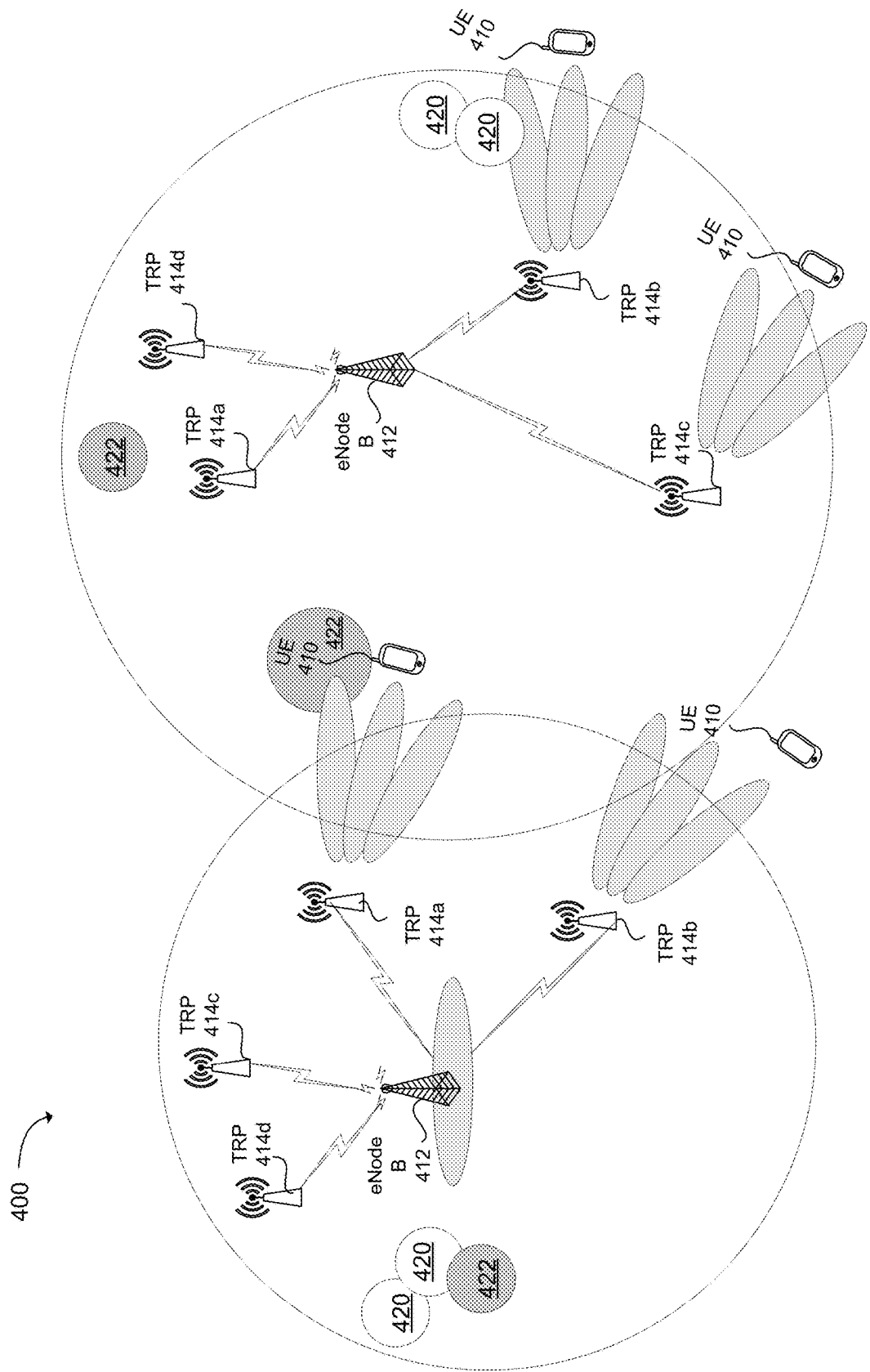
FIG. 4 illustrates a diagram of deployment of third generation partnership project (3GPP) next generation wireless communication system, fifth generation "5G" with overlay with macro cells and small cells in accordance with an example.

Turning now to FIG. 4, a diagram of deployment of third generation partnership project (3GPP) next generation wireless communication system fifth generation "5G" 400 with overlay with macro cells and small cells is depicted. In one aspect, one or more 3GPP 5G deployments may be used, which may include, for example: option 1) a standalone 3GPP 5G wireless communication system deployment; option 2) a 3GPP 5G wireless communication system deployment with an overlay with a macro layer, and option 3) a 3GPP 5G wireless communication system deployment with an overlay with a macro and a small cell. FIG. 4 includes an eNodeB 412 in communication with one or more extended TRP's 414 *a-d*. FIG. 4 illustrates option 3 with macro and small cells in co-channel (422) and inter-frequency small cells (420) and 3GPP 5G beamforming extended TRP's 414*a-d* (which may be collectively and/or individually referred to as "414"). A UE 410 in the 3GPP 5G wireless communication system may need to discover different deployments and handover when in mobility or transit.

Figure 5A:
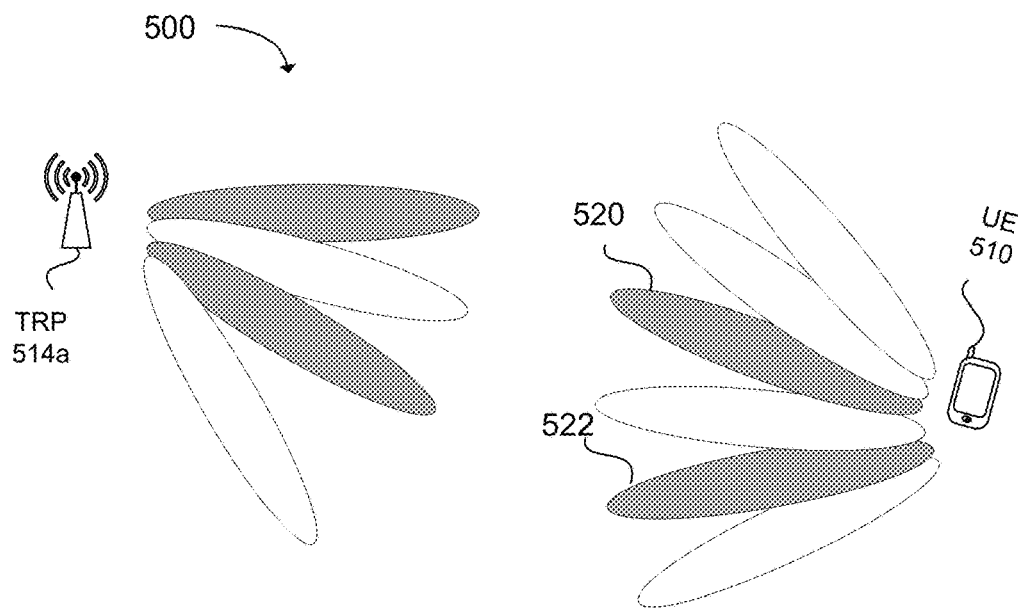
FIG. 5A illustrates a diagram of intra-transmission reception points (TRP) dual beam transmission in accordance with an example.
Figure 5B:
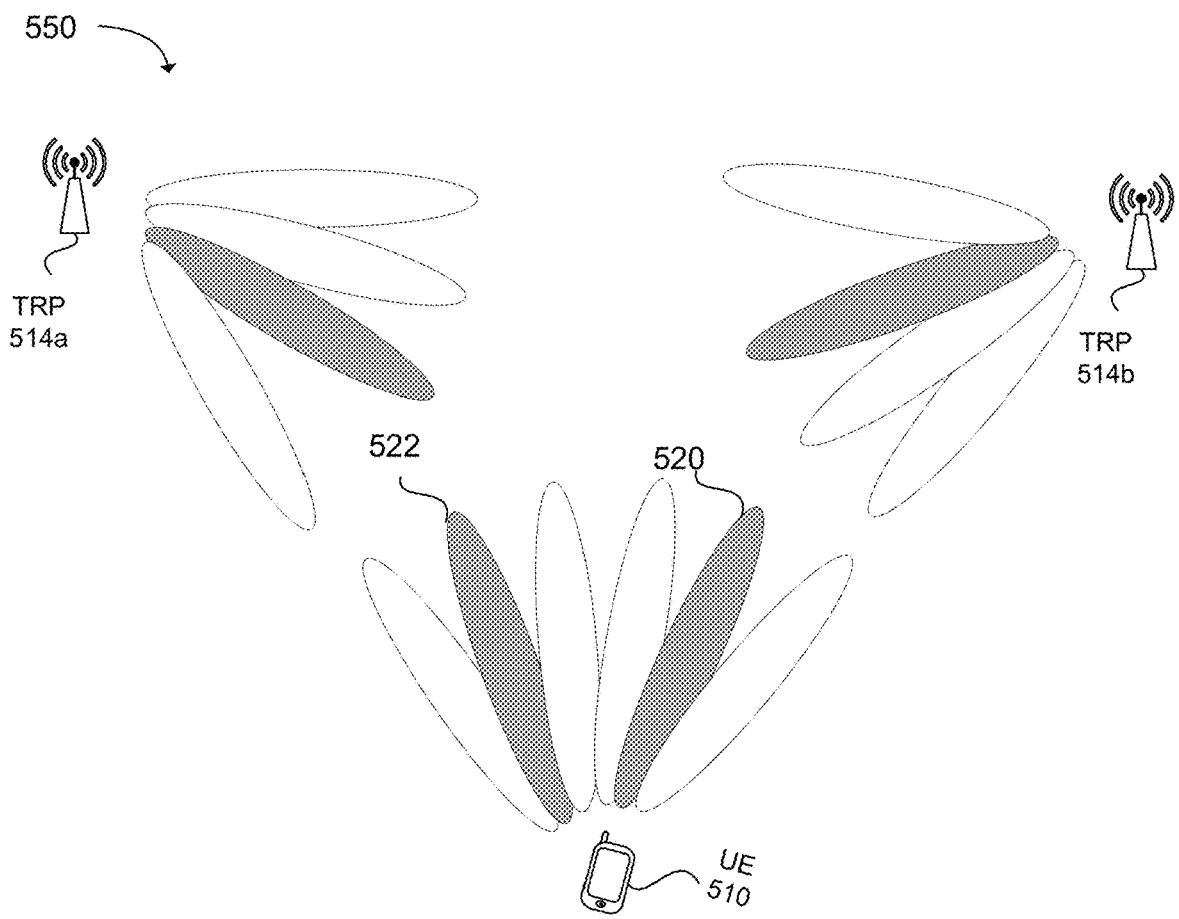
FIG. 5B illustrates a diagram of inter-transmission reception points (TRP) dual beam transmission in accordance with an example

Turning now to FIGS. 5A-5B, FIG. 5A illustrates a diagram 500 of intra-transmission reception points (TRP) dual beam transmission and FIG. 5B illustrates a diagram 550 of inter-transmission reception points (TRP) dual beam transmission. In one aspect, the UE can perform dual beam transmission operations. In another embodiment, the UE can form multiple transmission beams. In one aspect, the UE 510 can broadcast and connect multiple transmission beams toward a same eNB or different eNB (or transmission reception point 'TRP'). FIGS. 5A and 5B illustrate two dual beam scenarios with extended transmission reception points (TRPs) 514 (FIGS. 5A and 5B depict TRPs 514*a* and 514*b*): (1) intra-TRP dual beam and (2) inter-TRP dual beam. In one aspect, one or more eNodeBs can replace extended TRP's 514A or 514B, and/or be connected to extended TRP's 514A or 514B via a 3GPP 5G extended interface (not depicted for illustrative convenience).

In FIG. 5A, in an intra cell environment with the intra-TRP dual beam, the UE 510 forms 2 beams (illustrated in FIG. 5A as darker shaded beams) and connects to the same serving TRP 514*a*. In FIG. 5B, in an inter cell environment with inter-TRP dual beam transmission, the UE 510 dual beams (illustrated in FIG. 5B as darker shaded beams) are connected to different TRPs 514*a* 514*b*. In the inter cell environment case, it is also possible to use the dual beams for handover purpose.

In one aspect, in a higher layer, the UE dual beam operation can support the following procedures. 1) The UE dual beam operation can support an operation of beam association by sending communications to associate with an existing beam. 2) The UE dual beam operation can support an operation of beam addition by adding a second beam to the UE (alternatively, beam addition can be used for both the 1st beam and second beam of the dual beam operation by adding a first beam and the second beam when no beams previously existed). 3) The UE dual beam operation can support an operation of beam release to release a beam. 4) The UE dual beam operation can support an operation of beam change to switch communication from one beam to another beam. The operations of beam association comprising beam addition, beam release, and beam handover will be discussed in more detail in the proceeding paragraphs.

When a UE indicates that the UE is capable of providing dual transmission beams, a TRP can use and rely on a measurement report to associate the UE with a potential second beam.

Figure 6:
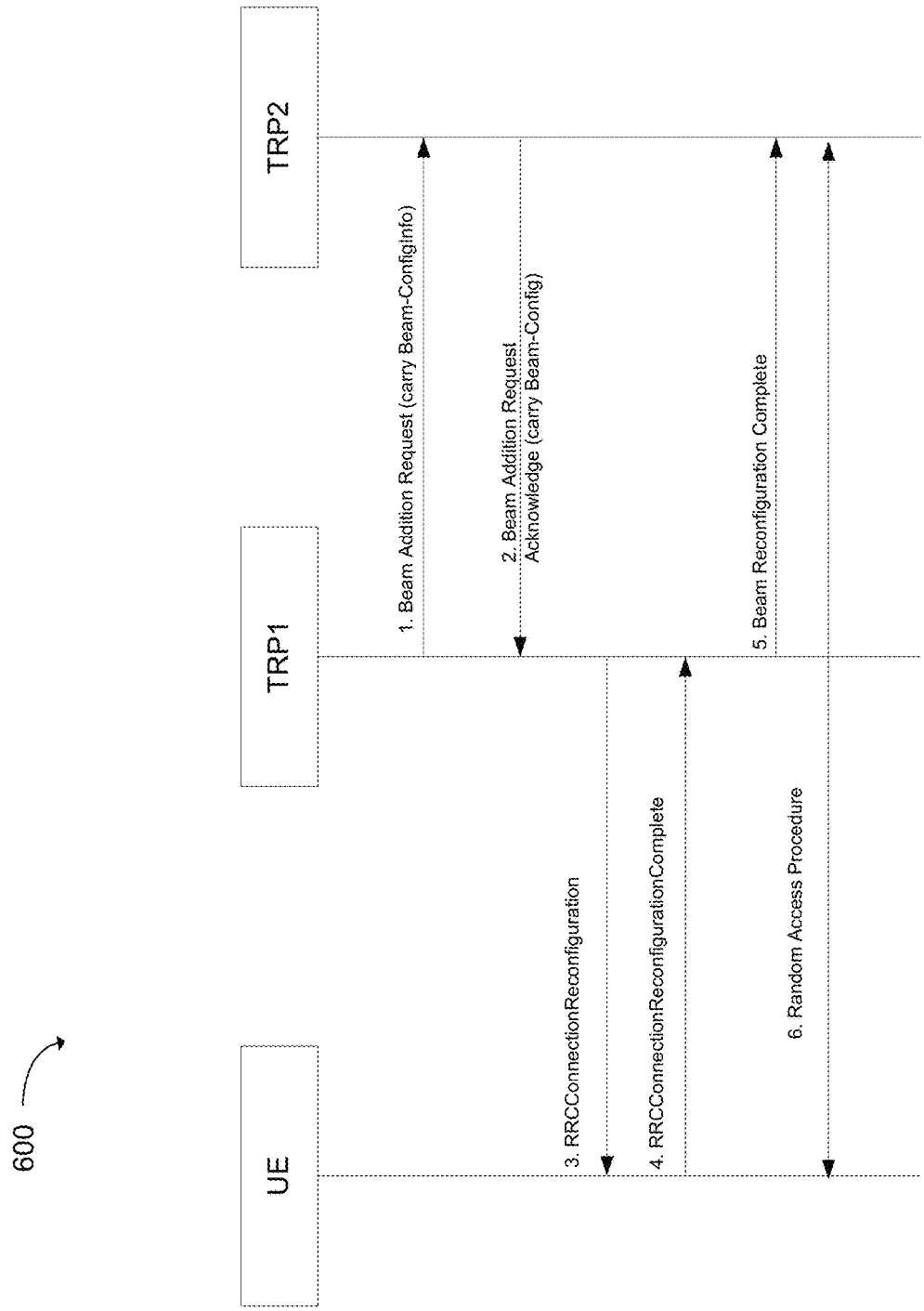
FIG. 6 illustrates a flow diagram for beam addition with transmission reception point (TRP) assist in accordance with an example.

In one aspect, as described in FIG. 6, one or more examples of adding a second beam or "second beam addition" are provided. FIG. 6 illustrates a flow diagram 600 for beam addition with transmission reception point (TRP) assist.

Beam Addition

FIG. 6 depicts a first option ("Option 1") with a TRP (e.g., "TRP1") to assist with beam addition. That is, 1) a beam addition request (e.g., with the beam addition request carrying beam configuration information) may be sent from a first extended TRP ("TRP1") to a second extended TRP ("TRP2"). 2) TRP2 can send back to TRP1 a beam addition request acknowledgement (which may include beam configuration information). 3) The TRP1 can send to the UE a radio resource control (RRC) connection-reconfiguration message. 4) The UE can send to the TRP1 a RRC connection-Reconfiguration complete message. 5) The TRP1 can send to the TRP2 a beam reconfiguration complete message. 6) The TRP2 can conduct with the UE a random access procedure. The random access procedure can enable the UE to synchronize with the TRP2.

Figure 7:
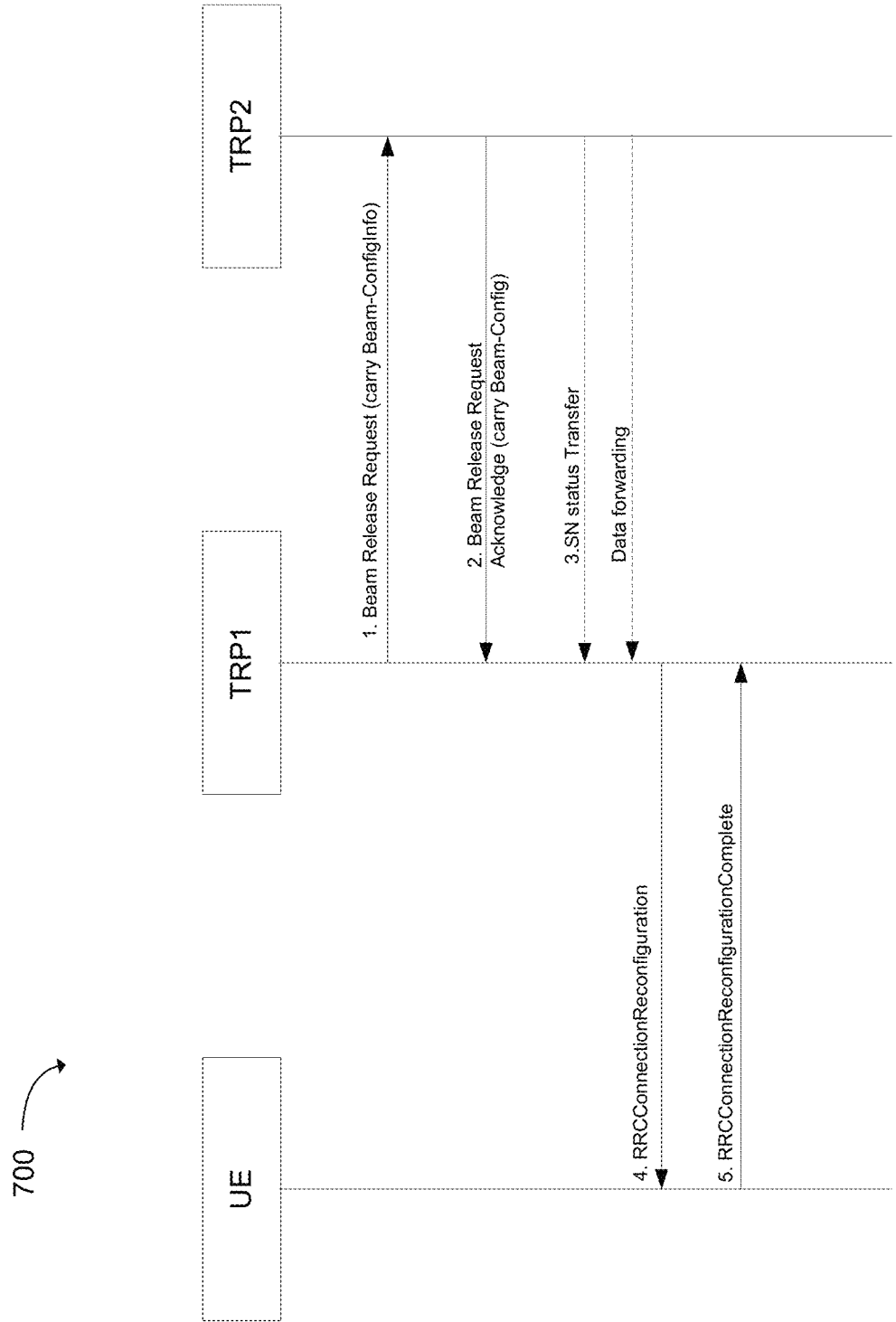
FIG. 7 illustrates a flow diagram for beam addition without transmission reception point (TRP) assist in accordance with an example.

Turning now to FIG. 7, a flow diagram 700 for beam addition without transmission reception point (TRP) assist. That is, FIG. 7 depicts a second option ("Option 2") for beam addition without extended TRP assist. In this option, the UE can perform a random access channel (RACH) procedure to gain access to a second extended TRP (e.g., the TRP2) while connecting to the firstextended TRP (e.g., the TRP1).

Beam Release

As depicted in FIG. 7, 1) a beam release request (e.g., with the beam release request carrying beam configuration information) may be sent from a first extended TRP ("TRP1") to a second_ extended TRP ("TRP2"). 2) TRP2 can send back to TRP1 a beam release request acknowledgement (which may include beam configuration information). 3) A sequence (SN) status transfer indication may be sent from TRP2 to TRP1. Furthermore, TRP2 may start data forwarding to TRP1. When a handover occurs between TRP2 and TRP1, to ensure the continuous data to the UE, the source TRP will forward the data to the target extended TRP before the path switch happens (which the SGW will direct the packet to the target TRP) 4) The TRP1 can send to the UE a radio resource control (RRC) connection-reconfiguration message. 5) The UE can send to the TRP1 a RRC connection-Reconfiguration complete message.

Beam Handover Using Dual Beam Operation

In one aspect, the dual transmission beam operation can be used for mobility purposes. In one aspect, the dual beam operation for mobility can be performed with beam addition, then beam release and/or beam change. For example, in a first option (Option 1) beam addition and/or beam release can be performed for beam handover using dual beam transmission operations. Also, the operations of FIG. 6 or FIG. 7 can be used to switch TRP1 to TRP2 by applying beam addition to TRP2 and beam release to TRP1. In a second option (Option 2) a beam change operation can be performed.

Beam Change

Figure 8:
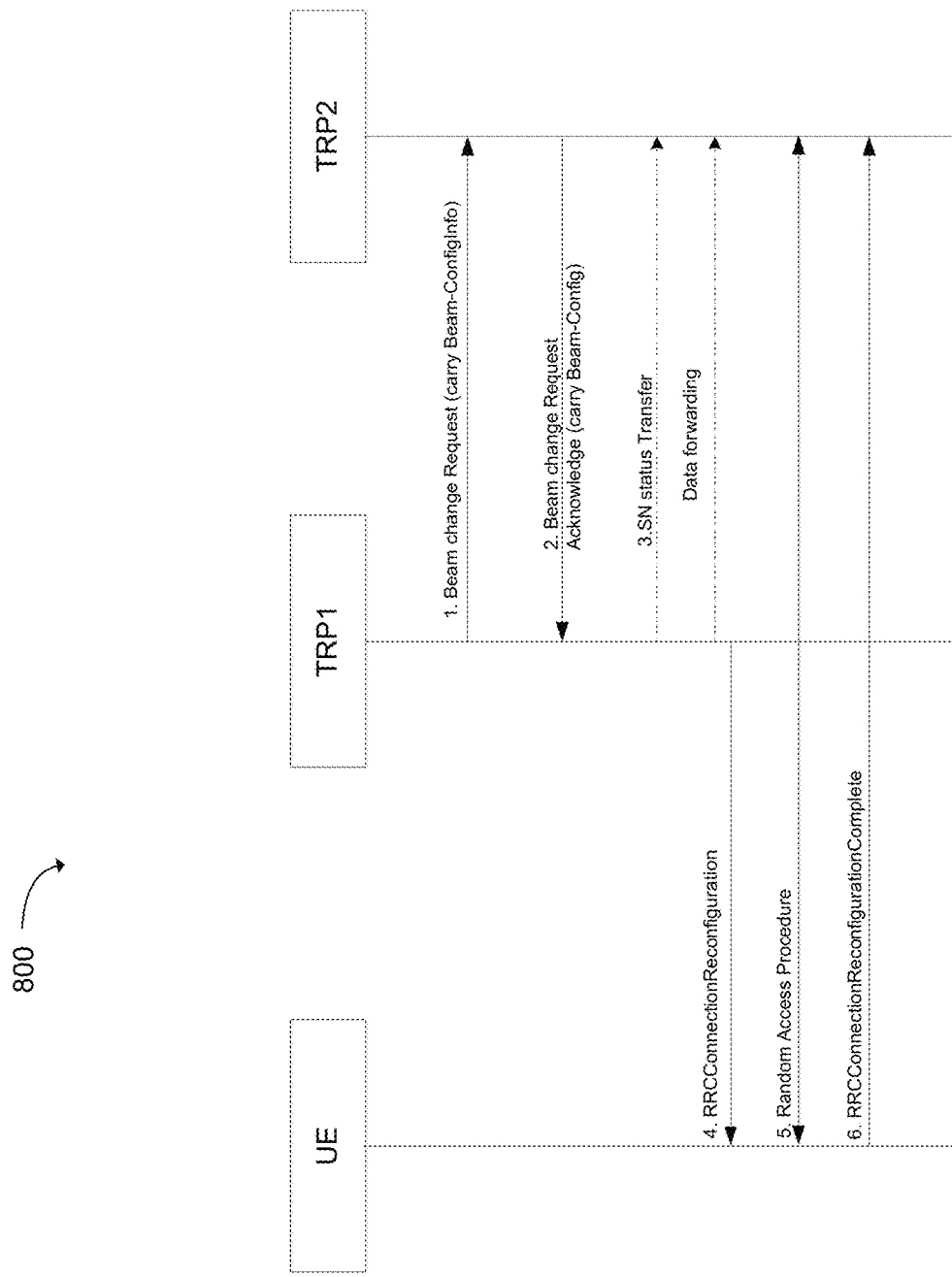
FIG. 8 illustrates a flow diagram for beam addition without transmission reception point (TRP) assist in accordance with an example.

As depicted in FIG. 8, 1) a beam change request (e.g., with the beam change request carrying beam configuration information) may be sent from a first TRP ("TRP1") to a second TRP ("TRP2"). 2) TRP2 can send back to TRP1 a beam change request acknowledgement (which may include beam configuration information). 3) A SN status transfer indication may be sent from TRP1 to TRP2. Furthermore, TRP1 may provide data forwarding to TRP2. 4) The TRP1 can send to the UE a radio resource control (RRC) connection-reconfiguration message. 5) A random access procedure may occur between the UE and the TRP2. 6) The UE can send to the TRP2 a RRC connection-Reconfiguration complete message.

In one aspect, the UE can be connected to a serving TRP1 using beam 1 (522 of FIGS. 5A-5B). The UE can perform a measurement using beam 2 (520 of FIGS. 5A-5B). The UE can send a measurement report to a serving TRP when an event triggers. Serving TRP1 can send a beam change request to target TRP2. Target TRP2 can reply with a beam change request acknowledgment (ACK) to serving TRP1 including the beam configuration information. The serving TRP1 can send an RRC reconfiguration message to the UE for beam addition. Serving TRP1 can forward data to target TRP2. The UE can perform a RACH operation on the target TRP. Optionally, a RACH-less handover can be applied using a pre-allocated UL grant. The UE can send an RRC complete message to target TRP2.

Figure 9:
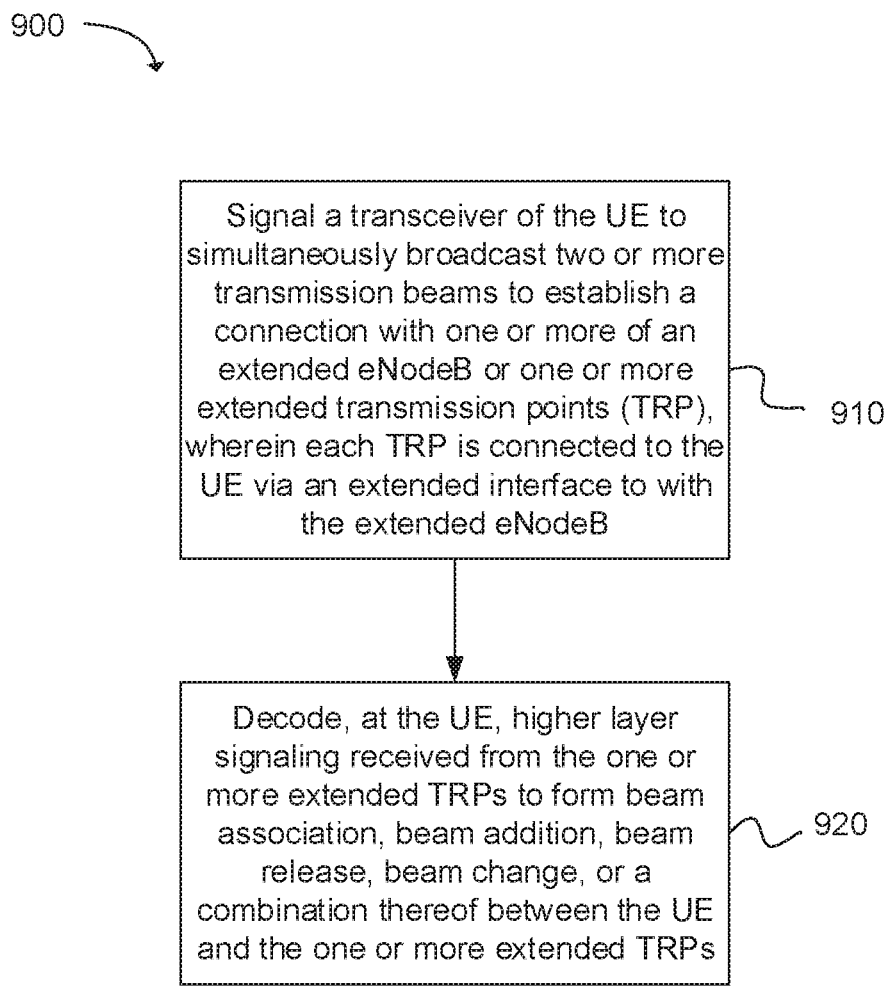
FIG. 9 depicts functionality of a user equipment (UE) operable to perform dual beam transmission with an eNodeB in accordance with an example.

FIG. 9 depicts functionality of a user equipment (UE) operable to perform dual beam transmission with an eNodeB and/or transmission reception points (TRPs) in accordance with an example. The functionality 900 of a user equipment (UE) is operable to communicate with one or more transmission reception points, as shown in the flow chart in FIG. 9. The UE can comprise one or more processors and memory configured to: signal a transceiver of the UE to simultaneously broadcast two or more transmission beams to establish a connection with one or more of an extended eNodeB or one or more extended transmission reception points (TRPs) that are connected via an extended interface to the extended eNodeB, as in block 910. The UE can comprise one or more processors and memory configured to: decode, at the UE, higher layer signaling received from the one or more extended TRPs to form a beam association, beam addition, beam release, beam change, or a combination thereof between the UE and the one or more extended TRPs, as in block 920.

In one aspect, in conjunction with and/or as part of at least one block of FIG. 9, the operations of 900 may include each of the following. The operations of 900 may include decoding higher layer signaling received from the one or more extended TRPs to form a beam association, beam addition, beam release, beam change, or a combination thereof.

The operations of 900 may include performing beam addition with a source extended TRP from the one or more extended TRPs to enable the source extended TRP to issue a beam addition request to a target extended TRP from the one or more extended TRPs, decoding a reconfiguration message, received from the source extended TRP, having configuration information received from the target extended TRP such that the UE performs the beam addition with a radio resource control (RRC) connection-reconfiguration complete message to enable the source extended TRP to send the target TRP data containing an indication the beam addition operation is complete.

In one aspect, performing beam addition with the one or more extended TRPs with assistance from a source extended TRP may include the source TRP issuing a beam addition request to a target TRP. With a response of the target TRP with configuration information, the source TRP may send a reconfiguration message to the UE. Then the source TRP can send a configuration complete message to the target TRP.

The operations of 900 may include receiving from the source extended TRP a reconfiguration message in order to perform a random access channel (RACH) operation to complete the handover operation, and/or receiving broadcast system information from the one or more extended TRPs that perform beam sweeping. The operations of 900 may include broadcasting intra-TRP dual transmission beams to establish a connection with a serving TRP of the one or more extended TRPs in an intra-cell environment, and/or broadcasting inter-TRP dual transmission beams to establish connection with the one or more extended TRPs in an inter-cell environment.

Figure 10:
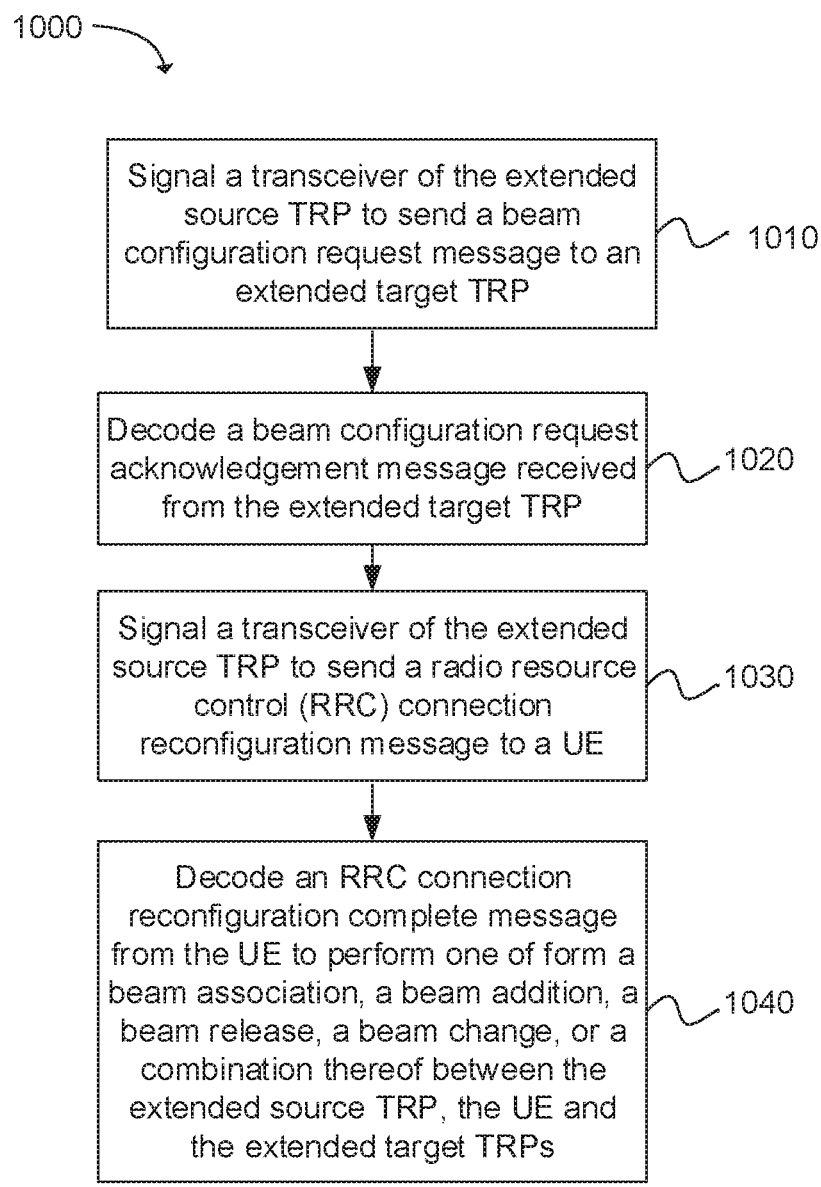
FIG. 10 depicts functionality of an eNodeB operable to perform dual beam transmission with the UE in accordance with an example.
Figure 11:
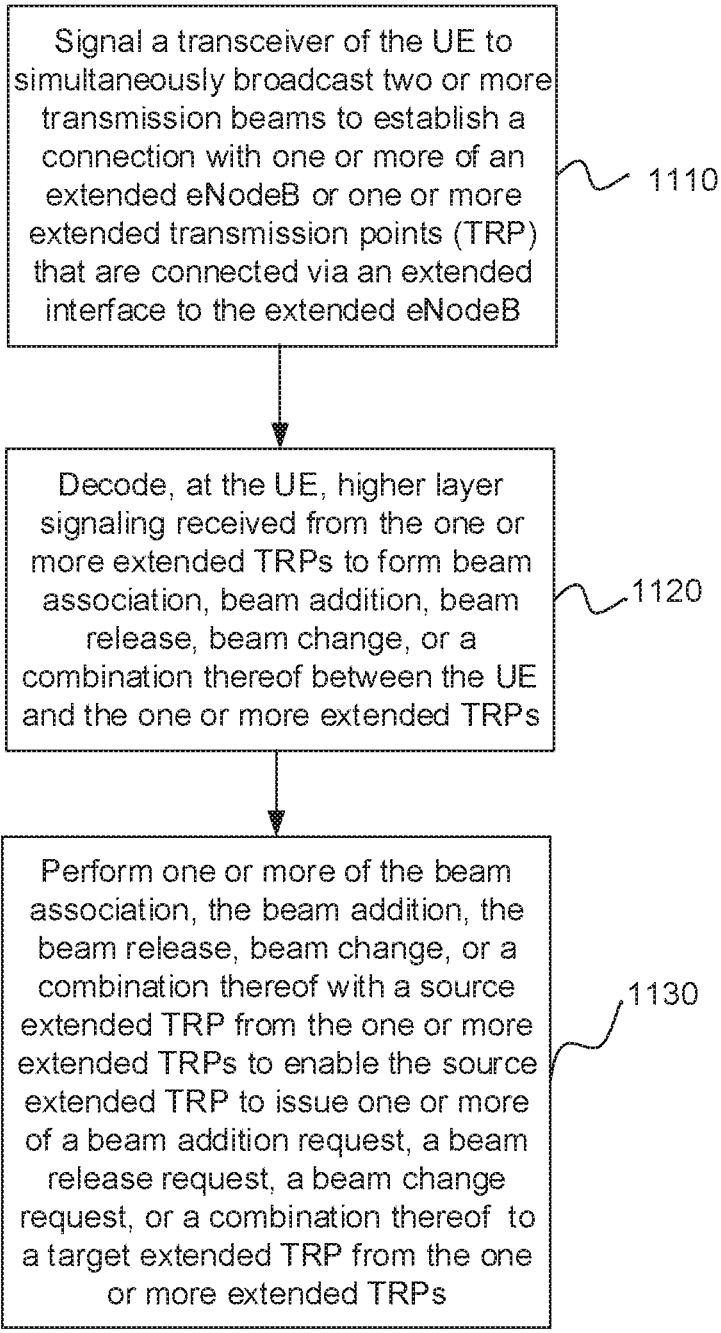
FIG. 11 depicts functionality of a user equipment (UE) operable to perform dual beam transmission with an eNodeB in accordance with an example.

FIG. 10 depicts functionality 1000 of a 3GPP 5G (extended) source transmission reception point (TRP) operable to communicate with a user equipment (UE) and an extended target transmission reception point (TRP) in accordance with an example. The functionality 1000 of the extended source TRP operable to communicate with the UE, as shown in the flow chart in FIG. 10. The apparatus comprises one or more processors and memory configured to: signal a transceiver of the extended source TRP to send a beam configuration request message to an extended target TRP, as in block 1010. The apparatus can comprise one or more processors and memory configured to: decode a beam configuration request acknowledgement message received from the extended target TRP, as in block 1020. The apparatus can comprise one or more processors and memory configured to: signal a transceiver of the extended source TRP to send a radio resource control (RRC) connection reconfiguration message to a UE, as in block 1030. The apparatus can comprise one or more processors and memory configured to: decode an RRC connection reconfiguration complete message from the UE to perform one of form a beam association, a beam addition, a beam release, a beam change, or a combination thereof between the extended source TRP, the UE and the extended target TRPs, as in block 1040. FIG. 11 depicts functionality of a user equipment (UE) operable to perform dual beam transmission with a 3GPP 5G ("extended") eNodeB and/or transmission reception points (TRP) in accordance with an example. The functionality 1100 of a user equipment (UE) operable to communicate with one or more transmission reception points, as shown in the flow chart in FIG. 11. The UE can comprise one or more processors and memory configured to: signal a transceiver of the UE to simultaneously broadcast two or more transmission beams to establish a connection with one or more of an extended eNodeB or one or more extended transmission reception points (TRP), wherein each extended TRP is connected to the UE via an extended interface with the extended eNodeB, as in block 1110. The UE can comprise one or more processors and memory configured to: decode, at the UE, higher layer signaling received from the one or more extended TRPs to form a beam association, beam addition, beam release, beam change, or a combination thereof between the UE and the one or more extended TRPs, as in block 1120. The UE can comprise one or more processors and memory configured to: perform one or more of the beam association, the beam addition, the beam release, beam change, or a combination thereof with a source extended TRP from the one or more extended TRPs to enable the source extended TRP to issue one or more of a beam addition request, a beam release request, a beam change request, or a combination thereof to a target extended TRP from the one or more extended TRPs, as in block 1130.

Figure 12:
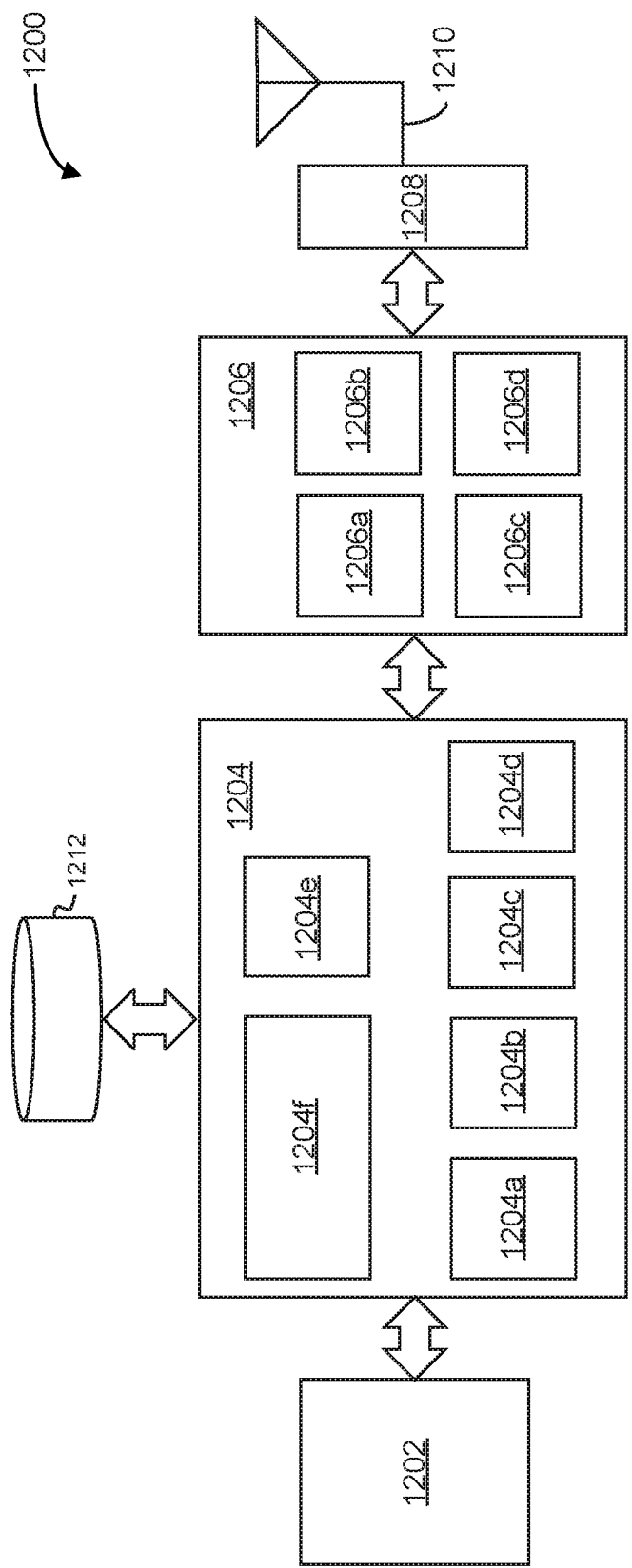
FIG. 12 illustrates a diagram of example components of a User Equipment (UE) device in accordance with an example.

FIG. 12 illustrates a diagram of example components of a User Equipment (UE) device in accordance with an example. FIG. 12 illustrates, for one aspect, example components of a User Equipment (UE) device 1200. In some aspects, the UE device 1200 can include application circuitry 1202, baseband circuitry 1204, Radio Frequency (RF) circuitry 1206, front-end module (FEM) circuitry 1208 and one or more antennas 1210, coupled together at least as shown. The UE 1200 may also include a transceiver module (not shown for illustrative convenience) having one or more transceivers, as more clearly described in FIG. 14 of the wireless device 1420 (e.g., a UE).

The application circuitry 1202 can include one or more application processors. For example, the application circuitry 1202 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The processor(s) can include any combination of general-purpose processors and dedicated processors (e.g., graphics processors, application processors, etc.). The processors can be coupled with and/or can include a storage medium 1212, and can be configured to execute instructions stored in the storage medium 1212 to enable various applications and/or operating systems to run on the system.

The baseband circuitry 1204 can include circuitry such as, but not limited to, one or more single-core or multi-core processors. The baseband circuitry 1204 can include one or more baseband processors and/or control logic to process baseband signals received from a receive signal path of the RF circuitry 1206 and to generate baseband signals for a transmit signal path of the RF circuitry 1206. Baseband processing circuitry 1204 can interface with the application circuitry 1202 for generation and processing of the baseband signals and for controlling operations of the RF circuitry 1206. For example, in some aspects, the baseband circuitry 1204 can include a second generation (2G) baseband processor 1204a, third generation (3G) baseband processor 1204b, fourth generation (4G) baseband processor 1204c, and/or other baseband processor(s) 1204d for other existing generations, generations in development or to be developed in the future (e.g., fifth generation (5G), 6G, etc.). The baseband circuitry 1204 (e.g., one or more of baseband processors 1204a-d) can handle various radio control functions that enable communication with one or more radio networks via the RF circuitry 1206. The radio control functions can include, but are not limited to, signal modulation/demodulation, encoding/decoding, radio frequency shifting, etc. In some aspects, modulation/demodulation circuitry of the baseband circuitry 1204 can include Fast-Fourier Transform (FFT), precoding, and/or constellation mapping/demapping functionality. In some aspects, encoding/decoding circuitry of the baseband circuitry 1204 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1204 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1204e of the baseband circuitry 1204 can be configured to run elements of the protocol stack for signaling of the PHY, MAC, RLC, PDCP and/or RRC layers. In some aspects, the baseband circuitry can include one or more audio digital signal processor(s) (DSP) 1204f The audio DSP(s) 1204f can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1204 and the application circuitry 1202 can be implemented together such as, for example, on a system on a chip (SOC).

In some aspects, the baseband circuitry 1204 can provide for communication compatible with one or more radio technologies. For example, in some aspects, the baseband circuitry 1204 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1204 is configured to support radio communications of more than one wireless protocol can be referred to as multi-mode baseband circuitry.

RF circuitry 1206 can enable communication with wireless networks using modulated electromagnetic radiation through a non-solid medium. In various aspects, the RF circuitry 1206 can include switches, filters, amplifiers, etc. to facilitate the communication with the wireless network. RF circuitry 1206 can include a receive signal path which can include circuitry to down-convert RF signals received from the FEM circuitry 1208 and provide baseband signals to the baseband circuitry 1204. RF circuitry 1206 can also include a transmit signal path which can include circuitry to up-convert baseband signals provided by the baseband circuitry 1204 and provide RF output signals to the FEM circuitry 1208 for transmission.

In some aspects, the RF circuitry 1206 can include a receive signal path and a transmit signal path. The receive signal path of the RF circuitry 1206 can include mixer circuitry 1206a, amplifier circuitry 1206b and filter circuitry 1206c. The transmit signal path of the RF circuitry 1206 can include filter circuitry 1206c and mixer circuitry 1206a. RF circuitry 1206 can also include synthesizer circuitry 1206d for synthesizing a frequency for use by the mixer circuitry 1206a of the receive signal path and the transmit signal path. In some aspects, the mixer circuitry 1206a of the receive signal path can be configured to down-convert RF signals received from the FEM circuitry 1208 based on the synthesized frequency provided by synthesizer circuitry 1206d. The amplifier circuitry 1206b can be configured to amplify the down-converted signals and the filter circuitry 1206c can be a low-pass filter (LPF) or band-pass filter (BPF) configured to remove unwanted signals from the down-converted signals to generate output baseband signals. Output baseband signals can be provided to the baseband circuitry 1204 for further processing. In some aspects, the output baseband signals can be zero-frequency baseband signals, although the output baseband signals do not have to be zero-frequency baseband signals. In some aspects, mixer circuitry 1206a of the receive signal path can comprise passive mixers, although the scope of the aspects is not limited in this respect.

In some aspects, the mixer circuitry 1206a of the transmit signal path can be configured to up-convert input baseband signals based on the synthesized frequency provided by the synthesizer circuitry 1206d to generate RF output signals for the FEM circuitry 1208. The baseband signals can be provided by the baseband circuitry 1204 and can be filtered by filter circuitry 1206c. The filter circuitry 1206c can include a low-pass filter (LPF), although the scope of the aspects is not limited in this respect.

In some aspects, the mixer circuitry 1206a of the receive signal path and the mixer circuitry 1206a of the transmit signal path can include two or more mixers and can be arranged for quadrature downconversion and/or upconversion respectively. In some aspects, the mixer circuitry 1206a of the receive signal path and the mixer circuitry 1206a of the transmit signal path can include two or more mixers and can be arranged for image rejection (e.g., Hartley image rejection). In some aspects, the mixer circuitry 1206a of the receive signal path and the mixer circuitry 1206a can be arranged for direct downconversion and/or direct upconversion, respectively. In some aspects, the mixer circuitry 1206a of the receive signal path and the mixer circuitry 1206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1206 can include analog-to-digital converter (ADC) and digital-to-analog converter (DAC) circuitry and the baseband circuitry 1204 can include a digital baseband interface to communicate with the RF circuitry 1206.

In some dual-mode embodiments, a separate radio IC circuitry can be provided for processing signals for each spectrum, although the scope of the embodiments is not limited in this respect.

In some embodiments, the synthesizer circuitry 1206d can be a fractional-N synthesizer or a fractional N/N+1 synthesizer, although the scope of the embodiments is not limited in this respect as other types of frequency synthesizers can be suitable. For example, synthesizer circuitry 1206d can be a delta-sigma synthesizer, a frequency multiplier, or a synthesizer comprising a phase-locked loop with a frequency divider.

The synthesizer circuitry 1206d can be configured to synthesize an output frequency for use by the mixer circuitry 1206a of the RF circuitry 1206 based on a frequency input and a divider control input. In some embodiments, the synthesizer circuitry 1206d can be a fractional N/N+1 synthesizer.

In some embodiments, frequency input can be provided by a voltage controlled oscillator (VCO), although that is not a constraint. Divider control input can be provided by either the baseband circuitry 1204 or the applications processor 1202 depending on the desired output frequency. In some embodiments, a divider control input (e.g., N) can be determined from a look-up table based on a channel indicated by the applications processor 1202.

Synthesizer circuitry 1206d of the RF circuitry 1206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1206 can include an IQ/polar converter.

FEM circuitry 1208 can include a receive signal path which can include circuitry configured to operate on RF signals received from one or more antennas 1210, amplify the received signals and provide the amplified versions of the received signals to the RF circuitry 1206 for further processing. FEM circuitry 1208 can also include a transmit signal path which can include circuitry configured to amplify signals for transmission provided by the RF circuitry 1206 for transmission by one or more of the one or more antennas 1210.

In some embodiments, the FEM circuitry 1208 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1206). The transmit signal path of the FEM circuitry 1208 can include a power amplifier (PA) to amplify input RF signals (e.g., provided by RF circuitry 1206), and one or more filters to generate RF signals for subsequent transmission (e.g., by one or more of the one or more antennas 1210.

In some embodiments, the UE device 1200 can include additional elements such as, for example, memory/storage, display, camera, sensor, and/or input/output (I/O) interface.

Figure 13:
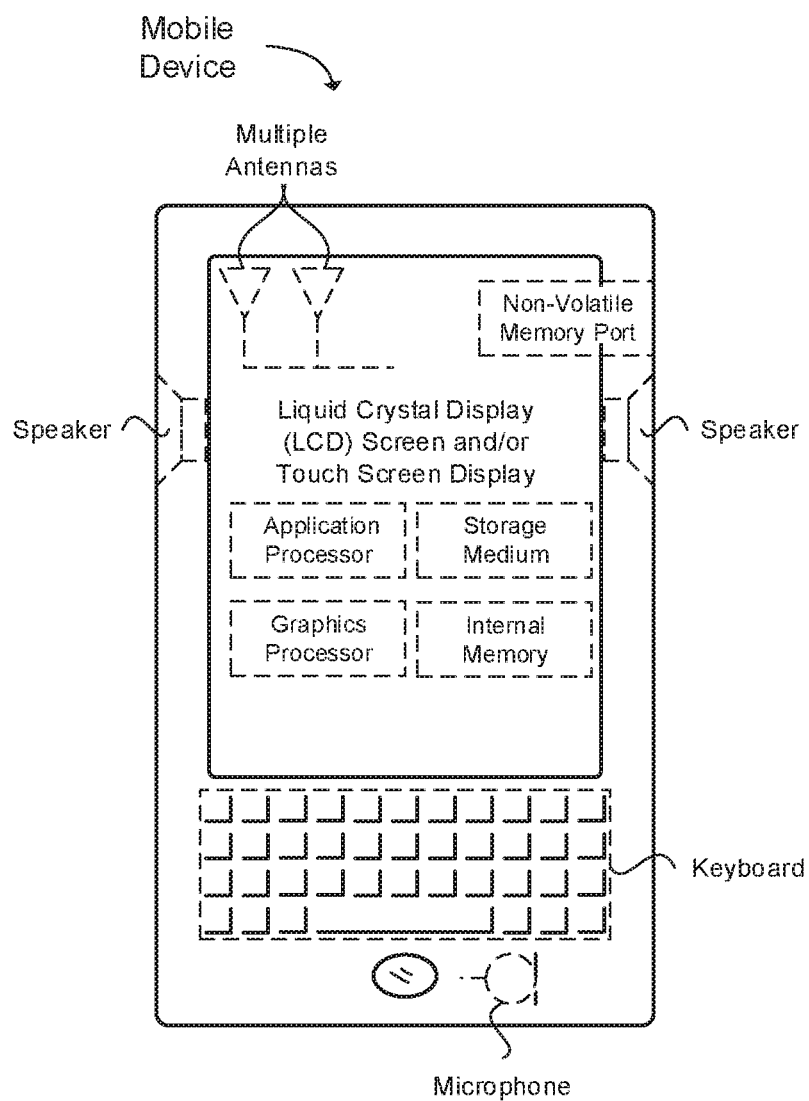
FIG. 13 illustrates a diagram of example components of a wireless device (e.g. User Equipment "UE") device in accordance with an example.

FIG. 13 illustrates a diagram of a wireless device (e.g., UE) in accordance with an example. FIG. 13 provides an example illustration of the wireless device, such as a user equipment (UE) UE, a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communicate with the application processor, the graphics processor, the display, the non-volatile memory port, and/or internal memory. In one aspect, the application processor and graphics processor are storage mediums.

Figure 14:
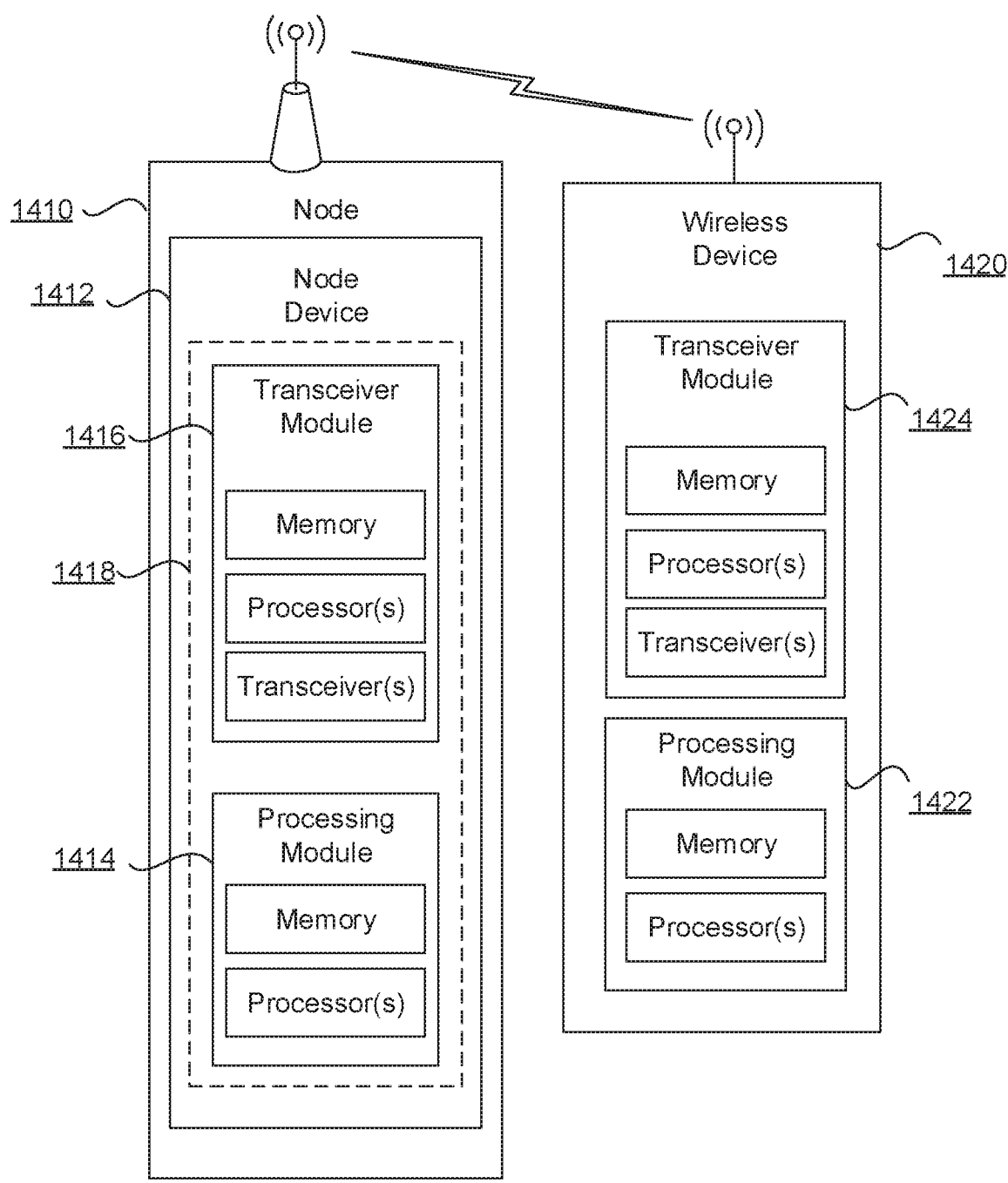
FIG. 14 illustrates a diagram of a node (e.g., eNB) and wireless device (e.g., UE) in accordance with an example.

FIG. 14 illustrates a diagram 1400 of a node 1410 (e.g., eNB and/or a base station) and wireless device (e.g., UE) in accordance with an example. The node 1410 can include a base station (BS), a Node B (NB), an evolved Node B (eNB), an extended eNB, a baseband unit (BBU), a remote radio head (RRH), a remote radio equipment (RRE), a remote radio unit (RRU), or a central processing module (CPM). In one aspect, the node can be a Serving GPRS Support Node. The node 1410 can include a node device 1412. The node device 1412 or the node 1410 can be configured to communicate with the wireless device 1420. The node device 1412 can be configured to implement the technology described. The node device 1412 can include a processing module 1414 and a transceiver module 1416. In one aspect, the node device 1412 can include the transceiver module 1416 and the processing module 1414 forming a circuitry 1418 for the node 1410. In one aspect, the transceiver module 1416 and the processing module 1414 can form a circuitry of the node device 1412. The processing module 1414 can include one or more processors and memory. In one embodiment, the processing module 1422 can include one or more application processors. The transceiver module 1416 can include a transceiver and one or more processors and memory. In one embodiment, the transceiver module 1416 can include a baseband processor.

The wireless device 1420 can include a transceiver module 1424 and a processing module 1422. The processing module 1422 can include one or more processors and memory. In one embodiment, the processing module 1422 can include one or more application processors. The transceiver module 1424 can include a transceiver and one or more processors and memory. In one embodiment, the transceiver module 1424 can include a baseband processor. The wireless device 1420 can be configured to implement the technology described. The node 1410 and the wireless devices 1420 can also include one or more storage mediums, such as the transceiver module 1416, 1424 and/or the processing module 1414, 1422. In one aspect, the components described herein of the transceiver module 1416 can be included in one or more separate devices that can be used in a cloud-radio access network (C-RAN) environment.

Examples

The following examples pertain to specific technology embodiments and point out specific features, elements, or actions that can be used or otherwise combined in achieving such embodiments.

Example 1 includes an apparatus of a user equipment (UE) operable to communicate with one or more extended transmission reception points (TRPs), the apparatus comprising one or more processors and memory configured to: signal a transceiver of the UE to simultaneously broadcast two or more transmission beams to establish a connection with one or more of: an extended eNodeB; or one or more extended transmission reception points (TRPs), wherein each extended TRP is connected to the UE via an extended interface with the extended eNodeB; and decode, at the UE, higher layer signaling received from the one or more extended TRPs to form a beam association, a beam addition, a beam release, a beam change, or a combination thereof between the UE and the one or more extended TRPs.

Example 2 includes the apparatus of example 1, wherein the one or more processors and memory are further configured to perform beam addition with a source extended TRP from the one or more extended TRPs to enable the source extended TRP to issue a beam addition request to a target extended TRP from the one or more extended TRPs.

Example 3 includes the apparatus of example 1 or 2, wherein the one or more processors and memory are further configured to decode a reconfiguration message, received from a source extended TRP, having configuration information received from a target extended TRP such that the UE performs the beam addition with a radio resource control (RRC) connection-reconfiguration complete message to enable the source extended TRP to send to the target TRP data containing an indication that the beam addition operation is complete.

Example 4 includes the apparatus of example 1, wherein the one or more processors and memory are further configured to signal the transceiver of the UE to commence a random access operation with a target extended TRP from the one or more extended TRPs.

Example 5 includes the apparatus of example 1 or 2, wherein the one or more processors and memory are further configured to perform beam addition with the one or more extended TRPs without assistance from the extended eNodeB.

Example 6 includes the apparatus of example 1 or 2, wherein the one or more processors and memory are further configured to perform beam release with a source extended TRP.

Example 7 includes the apparatus of example 1 or 2, wherein the one or more processors and memory are further configured to perform a handover operation using a beam addition operation and a beam release operation.

Example 8 includes the apparatus of example 1 or 2, wherein the one or more processors and memory are further configured to perform a handover operation using a beam change operation to enable a source extended TRP to send a beam change request and data including a status transfer indication to a target extended TRP.

Example 9 includes the apparatus of example 8, wherein the one or more processors and memory are further configured to receive from the source extended TRP a reconfiguration message in order to perform a random access channel (RACH) operation to complete the handover operation.

Example 10 includes the apparatus of example 1 or 2, wherein the one or more processors and memory are further configured to receive broadcast system information from one or more extended TRPs that are configured to perform beam sweeping.

Example 11 includes the apparatus of examples 1 or 2, wherein the one or more processors and memory are further configured to broadcast intra-TRP dual transmission beams to establish connection with a serving TRP of the one or more extended TRPs in an intra-cell environment.

Example 12 includes the apparatus of examples 1 or 2, wherein the one or more processors and memory are further configured to broadcast inter-TRP dual transmission beams to establish connection with the one or more extended TRPs in an inter-cell environment.

Example 13 includes the apparatus of example 1, wherein the apparatus includes at least one of an antenna, a touch sensitive display screen, a speaker, a microphone, a graphics processor, a baseband processor, an application processor, internal memory, a non-volatile memory port, and combinations thereof.

Example 14 includes an apparatus of an extended source transmission reception point (TRP) operable to communicate with a user equipment (UE) and an extended target transmission reception point (TRP), the apparatus comprising one or more processors and memory configured to: signal a transceiver of the extended source TRP to send a beam configuration request message to an extended target TRP; decode a beam configuration request acknowledgement message received from the extended target TRP; signal a transceiver of the extended source TRP to send a radio resource control (RRC) connection reconfiguration message to a UE; and decode an RRC connection reconfiguration complete message from the UE to perform one of form a beam association, a beam addition, a beam release, a beam change, or a combination thereof between the extended source TRP, the UE and the extended target TRPs.

Example 15 includes the apparatus of example 14, wherein beam addition is performed via the UE with the source extended TRP to enable the source extended TRP to issue a beam addition request to the target extended TRP.

Example 16 includes the apparatus of example 14 or 15, wherein the one or more processors and memory are further configured to signal the transceiver of the source extended TRP to send a reconfiguration message, having configuration information received from the target extended TRP such that the UE performs the beam addition with a radio resource control (RRC) connection-reconfiguration complete message to enable the source extended TRP to send to the target TRP data containing an indication the beam addition operation is complete.

Example 17 includes the apparatus of example 14 or 15, wherein the one or more processors and memory are further configured to signal a transceiver of the source extended TRP to receive from the UE a random access operation with the target extended TRP.

Example 18 includes the apparatus of example 14 or 15, wherein beam addition is performed by the UE with one or more extended TRPs without assistance from a source extended TRP.

Example 19 includes the apparatus of examples 14 or 15, wherein the one or more processors and memory are further configured to perform beam release with the source extended TRP.

Example 20 includes the apparatus of example 14 or 15, wherein a handover operation is performed using a beam addition operation and a beam release operation.

Example 21 includes the apparatus of example 14 or 15, wherein a handover operation is performed by the UE using a beam change operation to enable the source extended TRP to send a beam change request and data including a status transfer indication to the target extended TRP.

Example 22 includes the apparatus of example 21, wherein the one or more processors and memory are further configured to signal a transceiver of the source extended TRP to send a reconfiguration message in order to perform a random access channel (RACH) operation to complete the handover operation.

Example 23 includes the apparatus of example 14 or 15, wherein the one or more processors and memory are further configured to receive broadcast system information from the one or more extended TRPs that perform beam sweeping.

Example 24 includes the apparatus of example 14 or 15, wherein intra-TRP dual transmission beams are broadcasted from the UE to establish connection with a serving TRP of the one or more extended TRPs in an intra-cell environment.

Example 25 includes the apparatus of example 14 or 15, wherein inter-TRP dual transmission beams are broadcasted from the UE to establish connection with the one or more extended TRPs in an inter-cell environment.

Example 26 includes at least one machine readable storage medium having instructions embodied thereon for a user equipment (UE) operable to communicate with one or more extended transmission reception points (TRPs), the instructions when executed cause the UE to: signal a transceiver of the UE to simultaneously broadcast two or more transmission beams to establish a connection with one or more of an extended eNodeB or one or more extended TRPs, wherein each extended TRP is connected to the UE via an extended interface with the extended eNodeB; encode, at the UE, higher layer signaling received from the one or more extended TRPs to form beam association, beam addition, beam release, beam change, or a combination thereof between the UE and the one or more extended TRPs; and perform one or more of the beam association, the beam addition, the beam release, beam change, or a combination thereof with a source extended TRP from the one or more extended TRPs to enable the source extended TRP to issue one or more of a beam addition request, a beam release request, a beam change request, or a combination thereof to a target extended TRP from the one or more extended TRPs.

Example 27 includes the at least one machine readable storage medium of example 26, wherein the one or more processors and memory are further configured to decode a reconfiguration message, received from the source extended TRP, having configuration information received from the target extended TRP such that the UE performs the beam addition with a radio resource control (RRC) connection-reconfiguration complete message to enable the source extended TRP to send to the target TRP data containing an indication the beam addition operation is complete.

Example 28 include an apparatus of a user equipment (UE) operable to communicate with one or more extended transmission reception points (TRPs), the apparatus comprising one or more processors and memory configured to: signal a transceiver of the UE to simultaneously broadcast two or more transmission beams to establish a connection with one or more of: an extended eNodeB; or one or more extended transmission reception points (TRPs), wherein each extended TRP is connected to the UE via an extended interface with the extended eNodeB; and decode, at the UE, higher layer signaling received from the one or more extended TRPs to form a beam association, a beam addition, a beam release, a beam change, or a combination thereof between the UE and the one or more extended TRPs.

Example 29 includes the apparatus of example 28, wherein the one or more processors and memory are further configured to perform beam addition with a source extended TRP from the one or more extended TRPs to enable the source extended TRP to issue a beam addition request to a target extended TRP from the one or more extended TRPs.

Example 30 includes the apparatus of example 29, wherein the one or more processors and memory are further configured to decode a reconfiguration message, received from a source extended TRP, having configuration information received from a target extended TRP such that the UE performs the beam addition with a radio resource control (RRC) connection-reconfiguration complete message to enable the source extended TRP to send to the target TRP data containing an indication that the beam addition operation is complete.

Example 31 includes the apparatus of example 30, wherein the one or more processors and memory are further configured to signal the transceiver of the UE to commence a random access operation with a target extended TRP from the one or more extended TRPs.

Example 32 includes the apparatus of example 29, wherein the one or more processors and memory are further configured to perform beam addition with the one or more extended TRPs without assistance from the extended eNodeB.

Example 33 includes the apparatus of example 29, wherein the one or more processors and memory are further configured to perform beam release with a source extended TRP.

Example 34 includes the apparatus of example 29, wherein the one or more processors and memory are further configured to perform a handover operation using a beam addition operation and a beam release operation.

Example 35 includes the apparatus of example 29, wherein the one or more processors and memory are further configured to perform a handover operation using a beam change operation to enable a source extended TRP to send a beam change request and data including a status transfer indication to a target extended TRP.

Example 36 includes the apparatus of example 28 wherein the one or more processors and memory are further configured to receive from the source extended TRP a reconfiguration message in order to perform a random access channel (RACH) operation to complete the handover operation.

Example 37 includes the apparatus of example 29, wherein the one or more processors and memory are further configured to receive broadcast system information from one or more extended TRPs that are configured to perform beam sweeping.

Example 38 includes the apparatus of any of example 29, wherein the one or more processors and memory are further configured to broadcast intra-TRP dual transmission beams to establish connection with a serving TRP of the one or more extended TRPs in an intra-cell environment.

Example 39 includes the apparatus of any of example 29, wherein the one or more processors and memory are further configured to broadcast inter-TRP dual transmission beams to establish connection with the one or more extended TRPs in an inter-cell environment.

Example 40 includes the apparatus of example 28, wherein the apparatus includes at least one of an antenna, a touch sensitive display screen, a speaker, a microphone, a graphics processor, a baseband processor, an application processor, internal memory, a non-volatile memory port, and combinations thereof.

Example 41 includes an apparatus of an extended source transmission reception point (TRP) operable to communicate with a user equipment (UE) and an extended target transmission reception point (TRP), the apparatus comprising one or more processors and memory configured to: signal a transceiver of the extended source TRP to send a beam configuration request message to an extended target TRP; decode a beam configuration request acknowledgement message received from the extended target TRP; signal a transceiver of the extended source TRP to send a radio resource control (RRC) connection reconfiguration message to a UE; and decode an RRC connection reconfiguration complete message from the UE to perform one of form a beam association, a beam addition, a beam release, a beam change, or a combination thereof between the extended source TRP, the UE and the extended target TRPs.

Example 42 includes the apparatus of example 41, wherein beam addition is performed via the UE with the source extended TRP to enable the source extended TRP to issue a beam addition request to the target extended TRP.

Example 43 includes the apparatus of example 42, wherein the one or more processors and memory are further configured to signal the transceiver of the source extended TRP to send a reconfiguration message, having configuration information received from the target extended TRP such that the UE performs the beam addition with a radio resource control (RRC) connection-reconfiguration complete message to enable the source extended TRP to send to the target TRP data containing an indication the beam addition operation is complete.

Example 44 includes the apparatus of example 42, wherein the one or more processors and memory are further configured to signal a transceiver of the source extended TRP to receive from the UE a random access operation with the target extended TRP.

Example 45 includes the apparatus of example 42, wherein beam addition is performed by the UE with one or more extended TRPs without assistance from a source extended TRP.

Example 46 includes the apparatus of any of example 42, wherein the one or more processors and memory are further configured to perform beam release with the source extended TRP.

Example 47 includes the apparatus of example 42, wherein a handover operation is performed using a beam addition operation and a beam release operation.

Example 48 includes the apparatus of example 42, wherein a handover operation is performed by the UE using a beam change operation to enable the source extended TRP to send a beam change request and data including a status transfer indication to the target extended TRP.

Example 49 includes the apparatus of example 48, wherein the one or more processors and memory are further configured to signal a transceiver of the source extended TRP to send a reconfiguration message in order to perform a random access channel (RACH) operation to complete the handover operation.

Example 50 includes the apparatus of example 42, wherein the one or more processors and memory are further configured to receive broadcast system information from the one or more extended TRPs that perform beam sweeping.

Example 51 includes the apparatus of example 42, wherein intra-TRP dual transmission beams are broadcasted from the UE to establish connection with a serving TRP of the one or more extended TRPs in an intra-cell environment.

Example 52 includes the apparatus of example 42, wherein inter-TRP dual transmission beams are broadcasted from the UE to establish connection with the one or more extended TRPs in an inter-cell environment.

Example 53 includes least one machine readable storage medium having instructions embodied thereon for a user equipment (UE) operable to communicate with one or more extended transmission reception points (TRPs), the instructions when executed cause the UE to: signal a transceiver of the UE to simultaneously broadcast two or more transmission beams to establish a connection with one or more of an extended eNodeB or one or more extended TRPs, wherein each extended TRP is connected to the UE via an extended interface with the extended eNodeB; encode, at the UE, higher layer signaling received from the one or more extended TRPs to form beam association, beam addition, beam release, beam change, or a combination thereof between the UE and the one or more extended TRPs; and perform one or more of the beam association, the beam addition, the beam release, beam change, or a combination thereof with a source extended TRP from the one or more extended TRPs to enable the source extended TRP to issue one or more of a beam addition request, a beam release request, a beam change request, or a combination thereof to a target extended TRP from the one or more extended TRPs.

Example 54 includes the at least one machine readable storage medium of example 53, wherein the one or more processors and memory are further configured to decode a reconfiguration message, received from the source extended TRP, having configuration information received from the target extended TRP such that the UE performs the beam addition with a radio resource control (RRC) connection-reconfiguration complete message to enable the source extended TRP to send to the target TRP data containing an indication the beam addition operation is complete.

Example 55 includes an apparatus of a user equipment (UE) operable to communicate with one or more extended transmission reception points (TRPs), the apparatus comprising one or more processors and memory configured to: signal a transceiver of the UE to simultaneously broadcast two or more transmission beams to establish a connection with one or more of: an extended eNodeB; or one or more extended transmission reception points (TRPs), wherein each extended TRP is connected to the UE via an extended interface with the extended eNodeB; and decode, at the UE, higher layer signaling received from the one or more extended TRPs to form a beam association, a beam addition, a beam release, a beam change, or a combination thereof between the UE and the one or more extended TRPs.

Example 56 includes the apparatus of example 55, wherein the one or more processors and memory are further configured to: perform beam addition with a source extended TRP from the one or more extended TRPs to enable the source extended TRP to issue a beam addition request to a target extended TRP from the one or more extended TRPs; decode a reconfiguration message, received from a source extended TRP, having configuration information received from a target extended TRP such that the UE performs the beam addition with a radio resource control (RRC) connection-reconfiguration complete message to enable the source extended TRP to send to the target TRP data containing an indication that the beam addition operation is complete; or signal the transceiver of the UE to commence a random access operation with a target extended TRP from the one or more extended TRPs; or perform beam addition with the one or more extended TRPs without assistance from the extended eNodeB.

Example 57 includes the apparatus of example 55 or 56, wherein the one or more processors and memory are further configured to perform beam release with a source extended TRP.

In Example 58, the subject matter of Example 55 or any of the Examples described herein may further include, wherein the one or more processors and memory are further configured to perform a handover operation using a beam addition operation and a beam release operation.

In Example 59, the subject matter of Example 55 or any of the Examples described herein may further include, wherein the one or more processors and memory are further configured to: perform a handover operation using a beam change operation to enable a source extended TRP to send a beam change request and data including a status transfer indication to a target extended TRP; or receive from the source extended TRP a reconfiguration message in order to perform a random access channel (RACH) operation to complete the handover operation.

In Example 60, the subject matter of Example 55 or any of the Examples described herein may further include, wherein the one or more processors and memory are further configured to: receive broadcast system information from one or more extended TRPs that are configured to perform beam sweeping; broadcast intra-TRP dual transmission beams to establish connection with a serving TRP of the one or more extended TRPs in an intra-cell environment; or broadcast inter-TRP dual transmission beams to establish connection with the one or more extended TRPs in an inter-cell environment.

In Example 61, the subject matter of Example 55 or any of the Examples described herein may further include, wherein the apparatus includes at least one of an antenna, a touch sensitive display screen, a speaker, a microphone, a graphics processor, a baseband processor, an application processor, internal memory, a non-volatile memory port, and combinations thereof.

Example 62 includes an apparatus of an extended source transmission reception point (TRP) operable to communicate with a user equipment (UE) and an extended target transmission reception point (TRP), the apparatus comprising one or more processors and memory configured to: signal a transceiver of the extended source TRP to send a beam configuration request message to an extended target TRP; decode a beam configuration request acknowledgement message received from the extended target TRP; signal a transceiver of the extended source TRP to send a radio resource control (RRC) connection reconfiguration message to a UE; and decode an RRC connection reconfiguration complete message from the UE to perform one of form a beam association, a beam addition, a beam release, a beam change, or a combination thereof between the extended source TRP, the UE and the extended target TRPs.

Example 63 includes the apparatus of example 62, wherein beam addition is performed via the UE with the source extended TRP to enable the source extended TRP to issue a beam addition request to the target extended TRP.

Example 64 includes the apparatus of example 62 or 63, wherein the one or more processors and memory are further configured to: signal the transceiver of the source extended TRP to send a reconfiguration message, having configuration information received from the target extended TRP such that the UE performs the beam addition with a radio resource control (RRC) connection-reconfiguration complete message to enable the source extended TRP to send to the target TRP data containing an indication the beam addition operation is complete; or signal a transceiver of the source extended TRP to receive from the UE a random access operation with the target extended TRP, wherein beam addition is performed by the UE with one or more extended TRPs without assistance from a source extended TRP; or perform beam release with the source extended TRP, wherein a handover operation is performed using a beam addition operation and a beam release operation, or a handover operation is performed by the UE using a beam change operation to enable the source extended TRP to send a beam change request and data including a status transfer indication to the target extended TRP.

In Example 65, the subject matter of Example 62 or any of the Examples described herein may further include, wherein the one or more processors and memory are further configured to: signal a transceiver of the source extended TRP to send a reconfiguration message in order to perform a random access channel (RACH) operation to complete the handover operation; or receive broadcast system information from the one or more extended TRPs that perform beam sweeping.

In Example 66, the subject matter of Example 62 or any of the Examples described herein may further include, wherein intra-TRP dual transmission beams are broadcasted from the UE to establish connection with a serving TRP of the one or more extended TRPs in an intra-cell environment.

In Example 67, the subject matter of Example 62 or any of the Examples described herein may further include, wherein inter-TRP dual transmission beams are broadcasted from the UE to establish connection with the one or more extended TRPs in an inter-cell environment.

Example 69 includes at least one machine readable storage medium having instructions embodied thereon for a user equipment (UE) operable to communicate with one or more extended transmission reception points (TRPs), the instructions when executed cause the UE to: signal a transceiver of the UE to simultaneously broadcast two or more transmission beams to establish a connection with one or more of an extended eNodeB or one or more extended TRPs, wherein each extended TRP is connected to the UE via an extended interface with the extended eNodeB; encode, at the UE, higher layer signaling received from the one or more extended TRPs to form beam association, beam addition, beam release, beam change, or a combination thereof between the UE and the one or more extended TRPs; and perform one or more of the beam association, the beam addition, the beam release, beam change, or a combination thereof with a source extended TRP from the one or more extended TRPs to enable the source extended TRP to issue one or more of a beam addition request, a beam release request, a beam change request, or a combination thereof to a target extended TRP from the one or more extended TRPs.

Example 69 includes the at least one machine readable storage medium of example 68, wherein the one or more processors and memory are further configured to decode a reconfiguration message, received from the source extended TRP, having configuration information received from the target extended TRP such that the UE performs the beam addition with a radio resource control (RRC) connection-reconfiguration complete message to enable the source extended TRP to send to the target TRP data containing an indication the beam addition operation is complete.

Example 70 includes a device of aa user equipment (UE) operable to communicate with one or more extended transmission reception points (TRPs), the device comprising: means for signaling a transceiver of the UE to simultaneously broadcast two or more transmission beams to establish a connection with one or more of an extended eNodeB or one or more extended TRPs, wherein each extended TRP is connected to the UE via an extended interface with the extended eNodeB; means for encoding, at the UE, higher layer signaling received from the one or more extended TRPs to form beam association, beam addition, beam release, beam change, or a combination thereof between the UE and the one or more extended TRPs; and means for performing one or more of the beam association, the beam addition, the beam release, beam change, or a combination thereof with a source extended TRP from the one or more extended TRPs to enable the source extended TRP to issue one or more of a beam addition request, a beam release request, a beam change request, or a combination thereof to a target extended TRP from the one or more extended TRPs.

Example 71 includes the device of example 70, further comprising means for decoding a reconfiguration message, received from the source extended TRP, having configuration information received from the target extended TRP such that the UE performs the beam addition with a radio resource control (RRC) connection-reconfiguration complete message to enable the source extended TRP to send to the target TRP data containing an indication the beam addition operation is complete.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to communicate with one or more extended transmission reception points (TRPs), the apparatus comprising one or more processors and memory configured to:
   signal a transceiver of the UE to simultaneously broadcast two or more transmission beams to establish a connection with one or more of an extended eNodeB and one or more extended transmission reception points (TRPs), wherein each extended TRP is configured to connect the UE to the extended eNodeB via an extended interface directly between each respective extended TRP and the extended eNodeB;
   decode, at the UE, higher layer signaling received from the one or more extended TRPs to perform a beam association, a beam addition, a beam release, a beam change, or a combination thereof between the UE and the one or more extended TRPs; and perform the beam addition with a source extended TRP of the one or more extended TRPs to enable the source extended TRP to issue a beam addition request of the beam addition to a target extended TRP of the one or more extended TRPs, wherein the beam addition is performed between the source extended TRP, the target extended TRP, and the UE without signaling between the extended eNodeB and any of the source extended TRP, the target extended TRP, and the UE;

wherein each of the one or more extended TRPs and the extended eNodeB are separate devices.

2. The apparatus of claim 1, wherein the one or more processors and memory are further configured to decode a reconfiguration message, received from the source extended TRP, having configuration information received from the target extended TRP such that the UE performs the beam addition with a radio resource control (RRC) connection-reconfiguration complete message to enable the source extended TRP to send to the target extended TRP data containing an indication that the beam addition is complete.

3. The apparatus of claim 1, wherein the one or more processors and memory are further configured to signal the transceiver of the UE to commence a random access operation with a target extended TRP of the one or more extended TRPs.

4. The apparatus of claim 1, wherein the one or more processors and memory are further configured to perform the beam release with the source extended TRP.

5. The apparatus of claim 1, wherein the one or more processors and memory are further configured to perform a handover operation using a beam addition operation and a beam release operation.

6. The apparatus of claim 1, wherein the one or more processors and memory are further configured to perform a handover operation using a beam change operation to enable the source extended TRP to send a beam change request and data including a status transfer indication to the target extended TRP.

7. The apparatus of claim 6, wherein the one or more processors and memory are further configured to receive from the source extended TRP a reconfiguration message in order to perform a random access channel (RACH) operation to complete the handover operation.

8. The apparatus of claim 1, wherein the one or more processors and memory are further configured to receive broadcast system information from a TRP of the one or more extended TRPs that is configured to perform beam sweeping.

9. The apparatus of claim 1, wherein the one or more processors and memory are further configured to broadcast intra-TRP dual transmission beams to establish a connection with a serving TRP of the one or more extended TRPs in an intra-cell environment.

10. The apparatus of claim 1, wherein the one or more processors and memory are further configured to broadcast inter-TRP dual transmission beams to establish connection with the one or more extended TRPs in an inter-cell environment.

11. The apparatus of claim 1, wherein the apparatus includes at least one of an antenna, a touch sensitive display screen, a speaker, a microphone, a graphics processor, a baseband processor, an application processor, internal memory, a non-volatile memory port, and combinations thereof.

12. An apparatus of a source extended transmission reception point (TRP) operable to communicate with a user equipment (UE) and a target extended TRP, wherein the source extended TRP is configured to connect the UE to an extended eNodeB via a first extended interface directly between the source extended TRP and the eNodeB and the target extended TRP is configured to connect the UE to the extended eNodeB via a second extended interface directly between the target extended TRP and the eNodeB, the apparatus comprising one or more processors and memory configured to:

signal a transceiver of the source extended TRP to send a beam configuration request message to the target extended TRP;

decode a beam configuration request acknowledgement message received from the target extended TRP;

signal the transceiver of the source extended TRP to send a radio resource control (RRC) connection reconfiguration message to the UE;

decode an RRC connection reconfiguration complete message from the UE to perform a beam association, a beam addition, a beam release, a beam change, or a combination thereof between the source extended TRP, the UE and the target extended TRP; and perform the beam addition between the source extended TRP, the target extended TRP, and the UE, the performance of the beam addition comprising issuing a beam addition request from the source extended TRP to the target extended TRP, and wherein the beam addition is performed without signaling between the extended eNodeB and any of the source extended TRP, the target extended TRP, and the UE;

wherein the source extended TRP, the target extended TRP, and the extended eNodeB are separate devices.

13. The apparatus of claim 12, wherein the one or more processors and memory are further configured to signal the transceiver of the source extended TRP to:

send the RRC connection reconfiguration message to the UE with configuration information received from the target extended TRP such that the UE performs the beam addition; and receive a radio resource control (RRC) connection-reconfiguration complete message from the UE to enable the source extended TRP to send to the target extended TRP data containing an indication that the beam addition is complete.

14. The apparatus of claim 12, wherein the one or more processors and memory are further configured to signal the transceiver of the source extended TRP to receive from the UE a random access operation with the target extended TRP.

15. The apparatus of claim 12, wherein the one or more processors and memory are further configured to perform the beam release with the source extended TRP.

16. The apparatus of claim 12, wherein a handover operation is performed using a beam addition operation and a beam release operation.

17. The apparatus of claim 12, wherein a handover operation is performed by the UE using a beam change operation to enable the source extended TRP to send a beam change request and data including a status transfer indication to the target extended TRP.

18. The apparatus of claim 17, wherein the one or more processors and memory are further configured to signal a transceiver of the source extended TRP to send the RRC connection reconfiguration message in order to perform a random access channel (RACH) operation to complete the handover operation.

19. The apparatus of claim 12, wherein the one or more processors and memory are further configured to receive broadcast system information from a TRP of the one or more extended TRPs that performs beam sweeping.

20. The apparatus of claim 12, wherein intra-TRP dual transmission beams are broadcasted from the UE to establish connection with a serving TRP of the one or more extended TRPs in an intra-cell environment.

21. The apparatus of claim 12, wherein inter-TRP dual transmission beams are broadcasted from the UE to establish connection with the one or more extended TRPs in an inter-cell environment.

22. At least one machine readable non-transitory storage medium having instructions embodied thereon for a user equipment (UE) operable to communicate with one or more extended transmission reception points (TRPs), each extended TRP configured to connect the UE to an extended eNodeB via an extended interface directly between each respective extended TRP and the extended eNodeB, the instructions when executed cause the UE to: signal a transceiver of the UE to simultaneously broadcast two or more transmission beams to establish a connection with one or more of the extended eNodeB and the one or more extended TRPs; decode, at the UE, higher layer signaling received from the one or more extended TRPs to form a beam association, a beam addition, a beam release, a beam change, or a combination thereof between the UE and the one or more extended TRPs; and perform one or more of the beam association, the beam addition, the beam release, the beam change, or a combination thereof with a source extended TRP of the one or more extended TRPs to enable the source extended TRP to issue one or more of a beam addition request, a beam release request, a beam change request, or a combination thereof to a target extended TRP of the one or more extended TRPs; wherein each of the one or more of the beam association, the beam addition, the beam release, the beam change, or a combination thereof are performed without signaling between the extended eNodeB and any of the source extended TRP, the target extended TRP, and the UE, wherein the source extended TRP, the target extended TRP, and the extended eNodeB are separate devices.

23. The at least one machine readable non-transitory storage medium of claim 22, wherein the one or more processors and memory are further configured to decode a reconfiguration message, received from the source extended TRP, having configuration information received from the target extended TRP such that the UE performs the beam addition with a radio resource control (RRC) connection-reconfiguration complete message to enable the source extended TRP to send to the target extended TRP data containing an indication the beam addition is complete.

* * * * *